United States Patent
Liu et al.

(10) Patent No.: US 9,817,586 B2
(45) Date of Patent: Nov. 14, 2017

(54) METHOD OF APPLICATION AWARE IO COMPLETION MODE CHANGER FOR KEY VALUE DEVICE

(71) Applicant: Samsung Electronics Co., Ltd., Suwon-si, Gyeonggi-do (KR)

(72) Inventors: Fei Liu, Fremont, CA (US); Yang Seok Ki, Palo Alto, CA (US); Xiling Sun, San Jose, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 21 days.

(21) Appl. No.: 15/134,361

(22) Filed: Apr. 20, 2016

(65) Prior Publication Data

US 2017/0242594 A1  Aug. 24, 2017

Related U.S. Application Data

(60) Provisional application No. 62/298,989, filed on Feb. 23, 2016.

(51) Int. Cl.

| G06F 3/00 | (2006.01) |
|---|---|
| G06F 13/00 | (2006.01) |
| G06F 3/06 | (2006.01) |
| G06F 13/26 | (2006.01) |
| G06F 13/22 | (2006.01) |

(52) U.S. Cl.
CPC ............ *G06F 3/0611* (2013.01); *G06F 3/067* (2013.01); *G06F 3/0659* (2013.01); *G06F 13/22* (2013.01); *G06F 13/26* (2013.01)

(58) Field of Classification Search
CPC ............. G06F 3/00; G06F 13/18; G06F 13/24
USPC ..................... 710/5, 8, 10, 14, 104
See application file for complete search history.

(56) References Cited

U.S. PATENT DOCUMENTS

| 7,225,309 | B2 | 5/2007 | DeWitt, Jr. et al. | |
|---|---|---|---|---|
| 7,797,406 | B2 | 9/2010 | Patel et al. | |
| 8,527,473 | B1 | 9/2013 | Brown et al. | |
| 2006/0200471 | A1* | 9/2006 | Holland | H04L 12/24 |
| 2010/0262740 | A1* | 10/2010 | Borchers | G06F 3/0613 |
| | | | | 710/263 |
| 2012/0179823 | A1* | 7/2012 | Hatasaki | G06F 9/461 |
| | | | | 709/226 |
| 2013/0054840 | A1* | 2/2013 | Sarcone | G06F 13/00 |
| | | | | 710/5 |

(Continued)

*Primary Examiner* — Farley Abad
*Assistant Examiner* — Getente A Yimer
(74) *Attorney, Agent, or Firm* — Renaissance IP Law Group LLP

(57) ABSTRACT

A system and method for enabling an application (125, 305, 310, 315) and a storage device (120) to be more aware of each other may include a computer (105), a processor (110), and a memory (115) as well as the storage device (120). An application (125, 305, 310, 315) stored in the memory may communicate with a user space device driver (130). The user space device driver (130) may include a Mode Configure Module (320) to receive an application profile (405, 430, 435) from the application (125, 305, 310, 315) and an Application Aware Module (325) to receive I/O commands (555) from the application (125, 305, 310, 315) and place them in command queues (510, 515, 520, 525, 535, 540, 545, 550) according to the application profile (405, 430, 435). The I/O commands (555) may then be sent to the storage device (120).

19 Claims, 12 Drawing Sheets

(56) References Cited

U.S. PATENT DOCUMENTS

2013/0191625 A1 7/2013 Mullens et al.
2015/0347327 A1* 12/2015 Blaine .................... G06F 13/18
 711/103

* cited by examiner

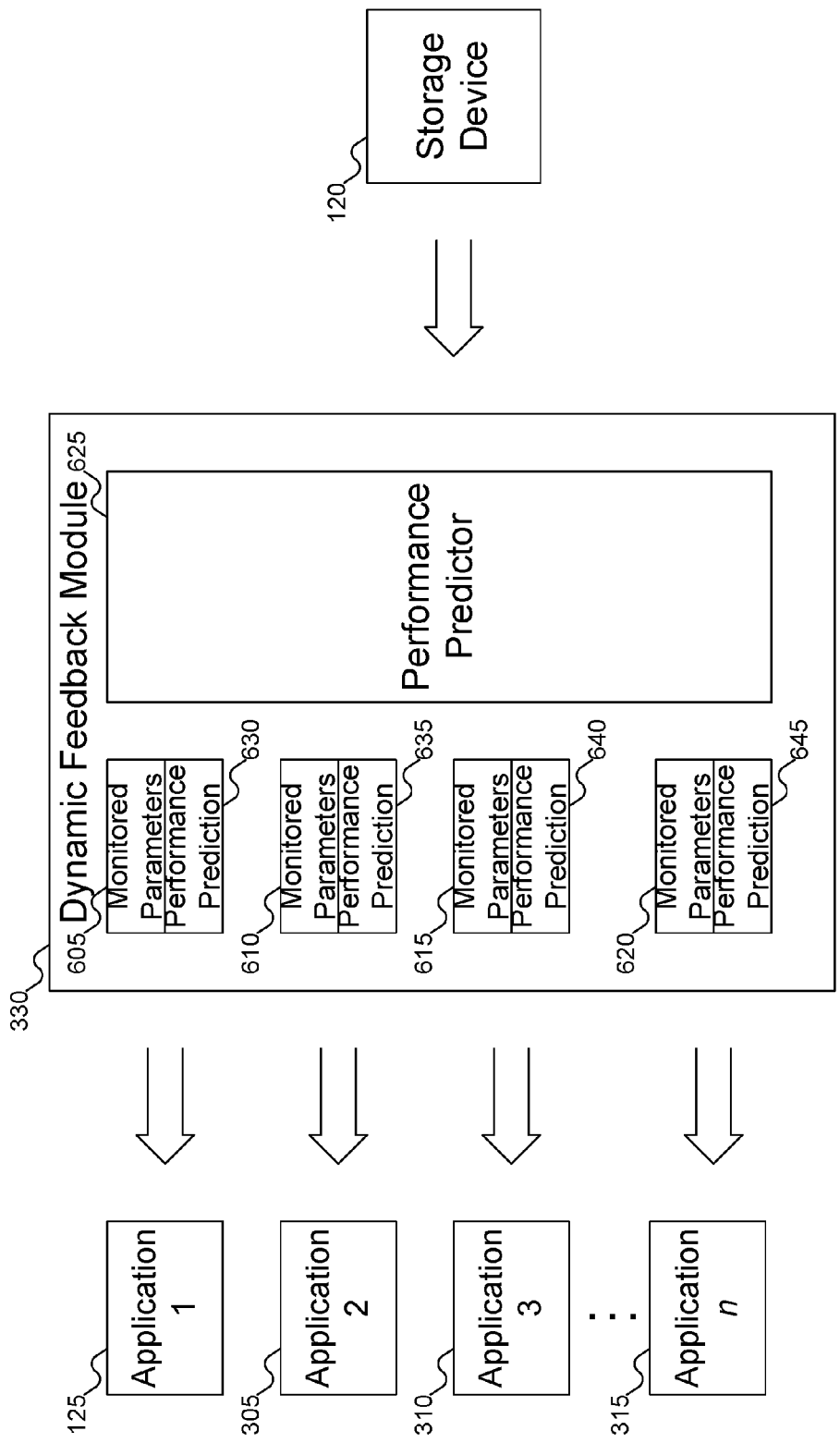

METHOD OF APPLICATION AWARE IO COMPLETION MODE CHANGER FOR KEY VALUE DEVICE

RELATED APPLICATION DATA

This application claims the benefit of U.S. Provisional Patent Application Ser. No. 62/298,989, filed Feb. 23, 2016, which is incorporated by reference herein for all purposes.

FIELD

This inventive concept relates to key-value stores, and more particularly to enabling an application and a storage device to improve their interactions using a key-value store on the storage device.

BACKGROUND

The use of flash devices, such as Solid State Drives (SSDs) to store key-value databases is a relatively recent innovation. Although not as fast as Dynamic Random Access Memory (RAM), SSDs are typically considerably faster than hard disk drives, while offering capacities that rival or exceed traditional hard disk drives. As prices for SSDs continue to drop, SSDs are more and more becoming the devices of choice for storing databases.

Databases often use a key-value interface. That is, a query of the database provides a key, and the database returns the corresponding value. This interface differs from the more conventional file-system and block-system interfaces, in which a query from an application specifies a particular file or block, and which is then mapped to a physical block address on the device. Using an SSD as a database involves replacing the convention interface with a key-value interface.

But while the application may provide a key and receive a value in return, the SSD treats all input/output (I/O) commands the same way, regardless of the particular conditions on the SSD. Nor does the application have any information that might suggest the best way for the application to utilize the SSD. Put another way, the application and the SSD have no ability to optimize their operations given overall conditions.

A need remains for a way to improve the performance of large databases and to balance the two objectives of minimizing latency and keeping cost down.

BRIEF DESCRIPTION OF THE DRAWINGS

FIG. 6 shows the application of FIG. 1 interfacing with the Dynamic Feedback Module of FIG. 3.

DETAILED DESCRIPTION

Figure 1:
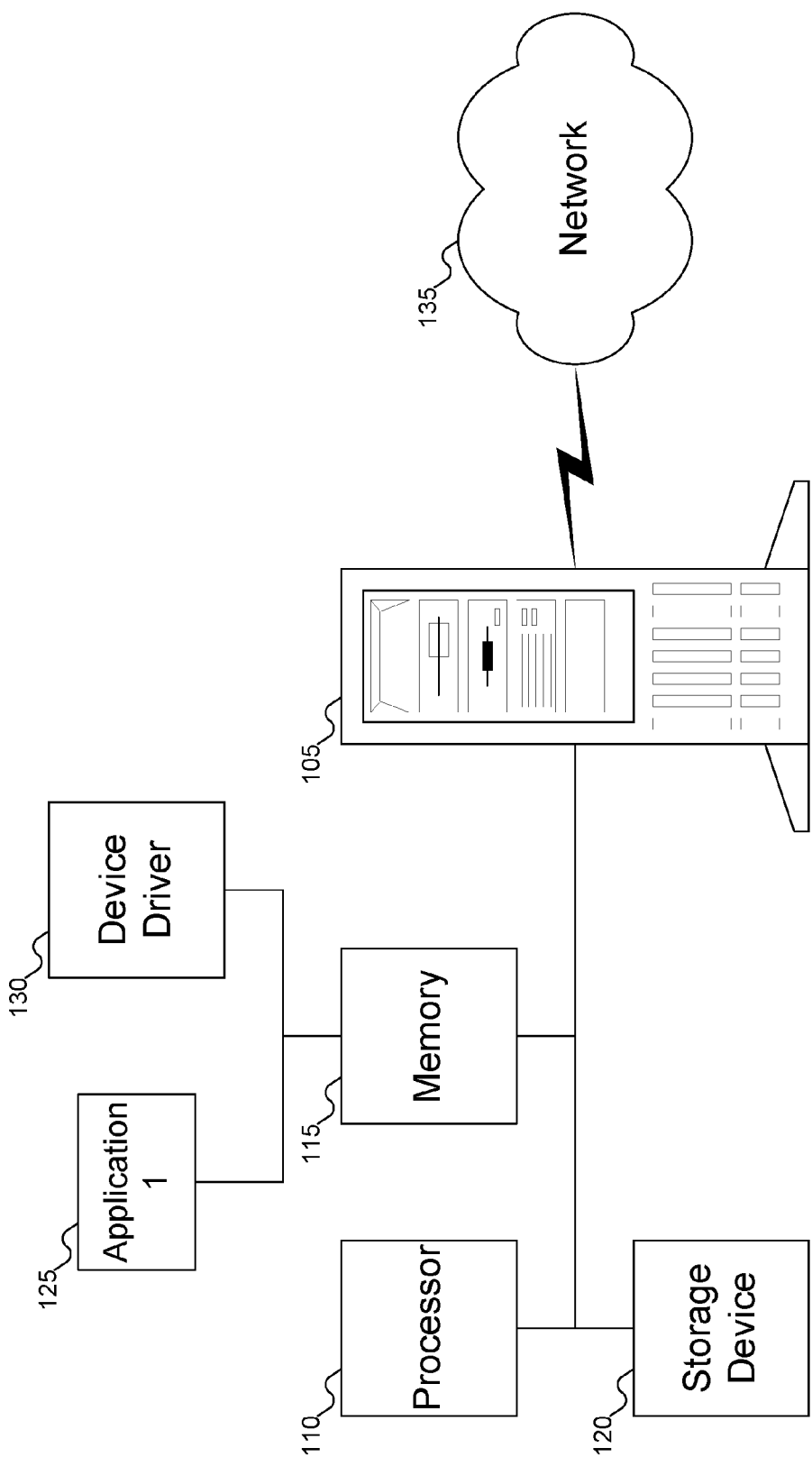
FIG. 1 shows a server with a storage device and an application designed to optimize their operations, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

A key-value device is an optimized key value store that complements some of the existing NoSQL databases and software defined storage with device-level functionality. NoSQL databases and software defined storage are finding significant and growing industry use in big data and real-time web applications. In order to fit into big data and real time applications, achieving improved performance is one of the biggest requirements of key-value devices. The host software should be designed to take advantage of key-value devices as much as possible.

A new way to dynamically adjust the processing of input/output (I/O) commands based on application profiles is needed for different application requirements. As devices become smarter and smarter, feedback from devices to host applications are also needed, for more intelligent decisions to be made to the application's benefits. Such improvements in key-value store operations will create a new vertically integrated system to better serve applications.

Embodiments of the inventive concept enable host software for key-value devices using non-volatile storage, such as flash memory, to dynamically adjust not only the way to process input/output (I/O) commands based on application profiles for different application, but to improve the command submitting path by feedback collection from the devices. The disclosed completion mode changer may take advantage of both interrupt and polling methods based on different application profiles. The disclosure describes how the application aware I/O completion mode changer is designed with three components: the Application Aware Module, the Mode Configure Module, and the Dynamic Feedback Module.

The Application Aware Module in the mode changer may be application aware. The Application Aware Module may apply different I/O completion policies towards the device for applications based on application profiles. I/O commands of applications may be put into different completion handling categories based on criteria like latency, I/O instructions Per Second (IOPS), and priority of the I/O command.

The Mode Configure Module may enable the application to configure the completion policy for any issued I/O commands. Applications may set up and monitor the parameters and switch conditions via the Mode Configure Module. The mode changer may dynamically adjust the I/O command completion policy based on the configuration inputs from the application.

The Dynamic Feedback Module may give applications feedback about the device behaviors and performance predictions, with built in algorithms for how to adjust I/O issuing behavior like I/O congestion control, I/O issuing models, I/O completion modes, etc.

FIG. 1 shows a server with a storage device and an application designed to optimize its operations, according to an embodiment of the inventive concept. In FIG. 1, server 105 is shown. Server 105 may include processor 110, memory 115, and storage device 120. Processor 110 may be any variety of processor: for example, an Intel Xeon, Celeron, Itanium, or Atom processor, or an AMD Opteron processor. Memory 115 may be any variety of memory, such as non-volatile memory (e.g., flash memory) or Static Random Access Memory (SRAM), but is typically Dynamic Random Access Memory (DRAM). Storage device 120 may be any variety of storage device that may benefit from embodiments of the inventive concept. Solid State Drives (SSDs) are one example of a storage device that may benefit from embodiments of the inventive concept. But any other variety of storage device that may provide the appropriate functionality (i.e., a key-value interface, mode configuration and application aware processing, and feedback) may also benefit from embodiments of the inventive concept. Server 105 itself may be replaced with any machine that offers comparable functionality, such as a desktop or laptop computer, with no loss of generality.

Within memory 115, server 105 may include application 125 and device driver 130. Application 125 may be any variety of application that may access a key-value store on storage device 120. While FIG. 1 shows only one application 125, in other embodiments of the inventive concept server 105 may provide functionality for multiple applications. And in yet other embodiments of the inventive concept, server 105 may provide access to a key-value store on storage device 120 to still more applications across network 135.

Device driver 130, also called a user space device driver (because it is a device driver resident in the user space of memory 115), provides an interface to storage device 120. Device driver 130 is discussed further with reference to FIG. 3 below.

Figure 2:
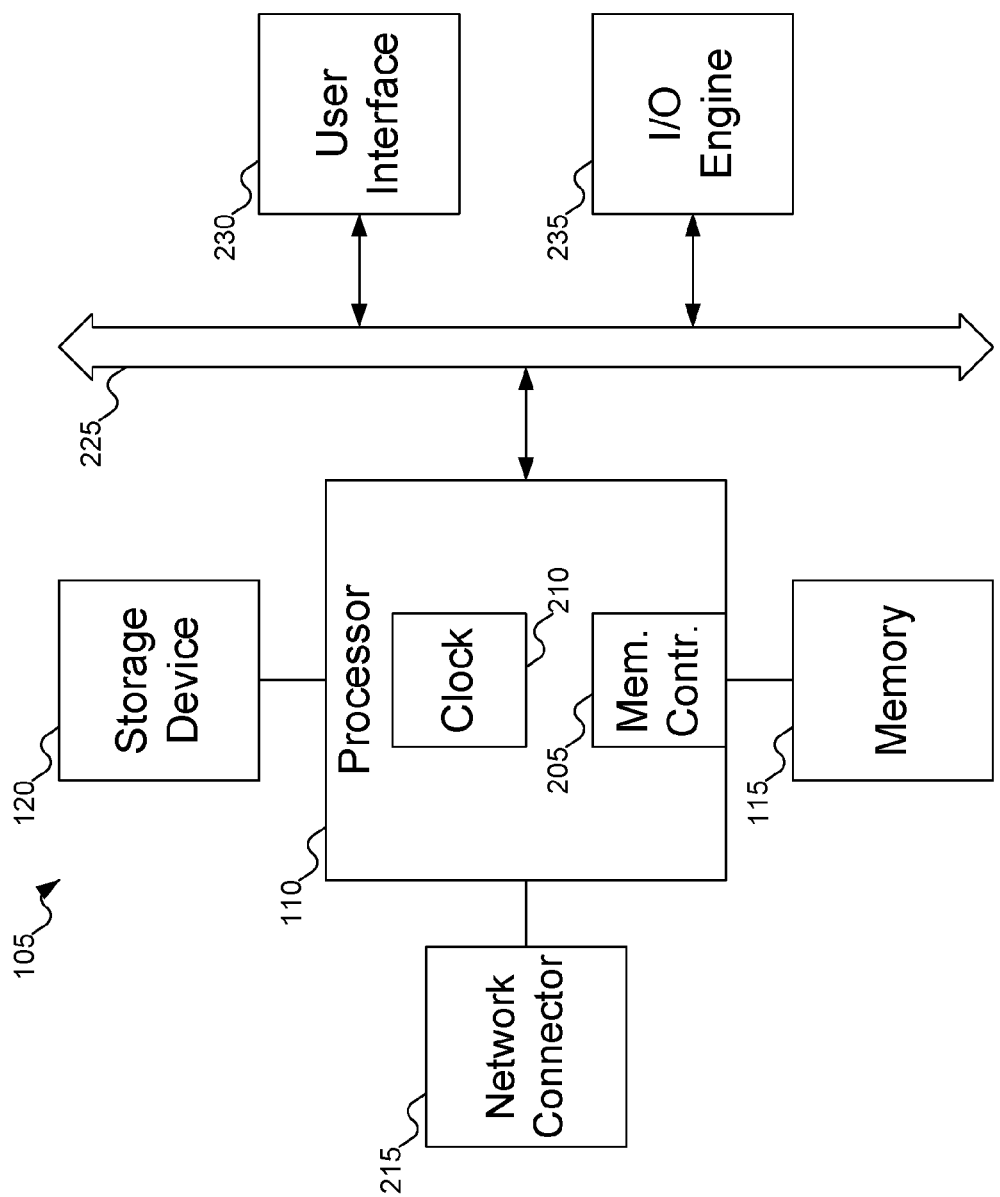
FIG. 2 shows additional details of the server of FIG. 1.

FIG. 2 shows additional details of server 105 of FIG. 1. Referring to FIG. 2, typically, machine or machines 105 include one or more processors 110, which may include memory controller 205 and clock 210, which may be used to coordinate the operations of the components of machine or machines 105. Processors 110 may also be coupled to memory 115, which may include random access memory (RAM), read-only memory (ROM), or other state preserving media, as examples. Processors 110 may also be coupled to storage devices 120, and to network connector 215, which may be, for example, an Ethernet connector or a wireless connector. Processors 220 may also be connected to a bus 225, to which may be attached user interface 230 and input/output interface ports that may be managed using input/output engine 235, among other components.

Figure 3:
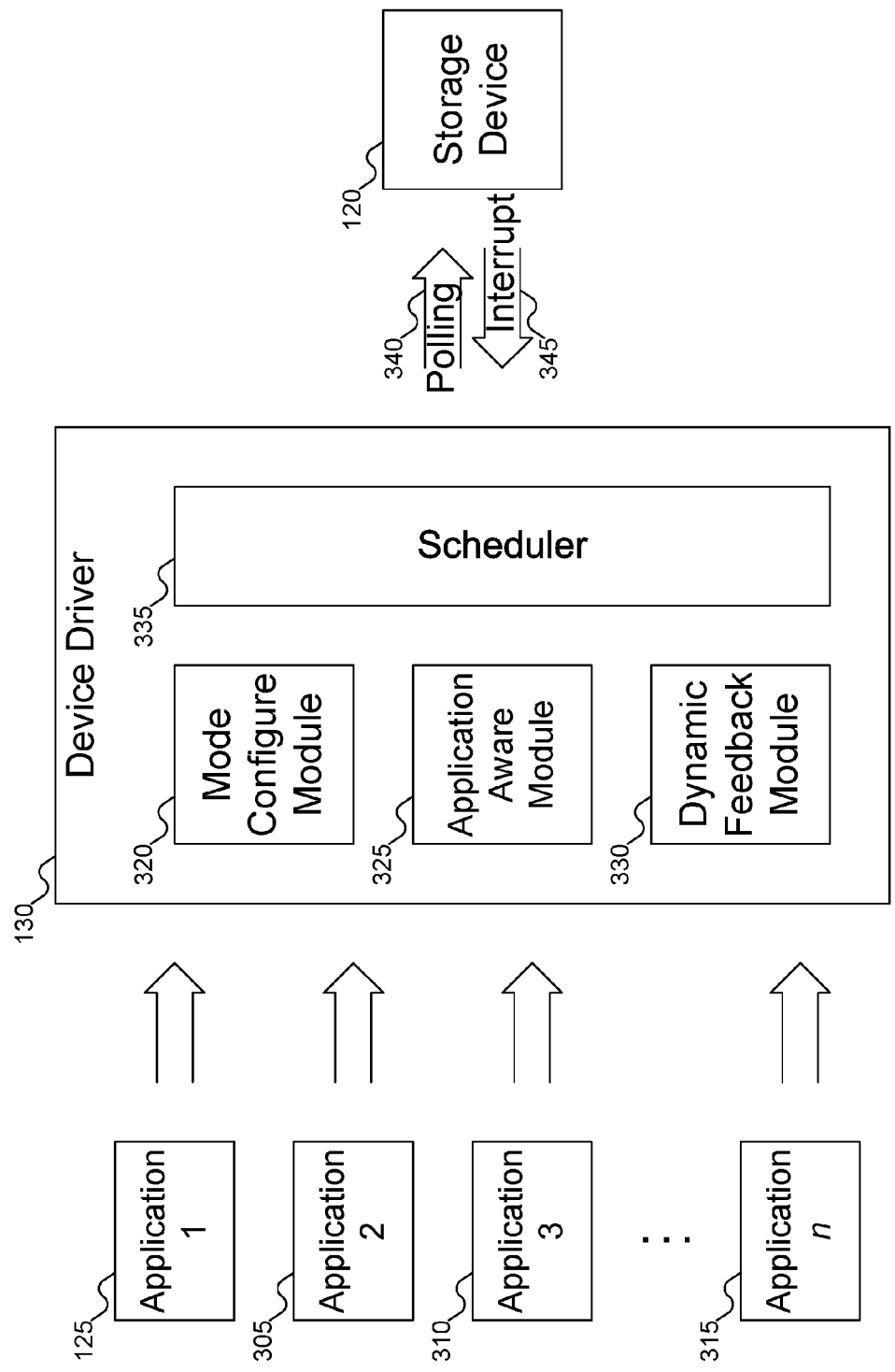
FIG. 3 shows the application of FIG. 1 interacting with a user space device driver, according to an embodiment of the inventive concept.

FIG. 3 shows application 125 of FIG. 1 interacting with user space device driver 130, according to an embodiment of the inventive concept. In FIG. 3, application 125, along with other applications 305, 310 and 315 (which are representative of any number of applications) may communicate with device driver 130. Device driver 130 may include four modules: Mode Configure Module 320, Application Aware Module 325, Dynamic Feedback Module 330, and scheduler 335. As will be discussed further with reference to FIGS. 4-6 below, Mode Configure Module 320, Application Aware Module 325, and Dynamic Feedback Module 330 enable applications 125, 305, 310, and 315 to know about the operation of storage device 120 and enable storage device 120 to know about applications 125, 305, 310, and 315.

Scheduler 335 is responsible for managing when a particular I/O command is to be provided to storage device 120. As will be discussed below with reference to FIGS. 5A-5B, a particular I/O command from application 125 may be assigned to any of a number of different command queues. Scheduler 335 may access I/O commands from the various command queues and forward them to storage device 120.

Scheduler 335 may provide any desired scheduling algorithm. For example, scheduler 335 may use a round robin schedule, wherein an I/O command is taken from one command queue, after which an I/O command is taken from another command queue, etc. Or, scheduler 335 may use a prioritizing scheduler. A prioritizing scheduler may recognize that different queues may have different priorities, and may favor queues of higher priority over queues of lower priority. But since it would not be desirable for an I/O command to languish forever in any given command queue (each command queue may have a deadline by which an instruction must be executed), the prioritizing scheduler may eventually access a lower priority command queue even when I/O commands remain in higher priority command queues. In addition, scheduler 335 may be fixed in advance or may be configured in real time. For example, if the capacities of the command queues are such that the current scheduling algorithm is not satisfactory, scheduler 335 may be reconfigured with a different scheduling algorithm to adjust. Then, when the capacities of the command queues drops, scheduler 335 may return to the original scheduling algorithm.

As one example of a prioritizing scheduler, assume that there are four command queues. The prioritizing scheduler may be designed so that in n units of time (be the units a fraction of a second or a number of processor cycles, among other possibilities), N I/O commands are scheduled from the lowest priority queue, 2N I/O commands are scheduled from the next lowest priority queue, 3N I/O commands are scheduled from the second highest priority queue, and 4N I/O commands are scheduled from the highest priority command queue.

More generally, a prioritizing scheduler may have the command queues ordered by priority. For a queue of a given priority, the prioritizing scheduler may select more I/O commands from that queue than from any queue with a lower priority.

Device driver 130 may interact with storage device 120 using either a polling system or an interrupt system: typically, both may be used. As shown in FIG. 3, polling 340 lets device driver 130 query storage device 120 about the completion status of any I/O commands at any desired time. Interrupt 345, on the other hand, lets storage device 120 inform device driver 130 when an I/O command has completed. Polling 340 has the advantage of high throughput: device driver 130 may poll storage device 120 as soon as it is ready to receive a new I/O command. Interrupt 345 has the advantage of low latency: device driver 130 may be informed almost instantaneously when a new I/O command arrives. Interrupt 345 also has lower power consumption than polling 340.

Figure 4:
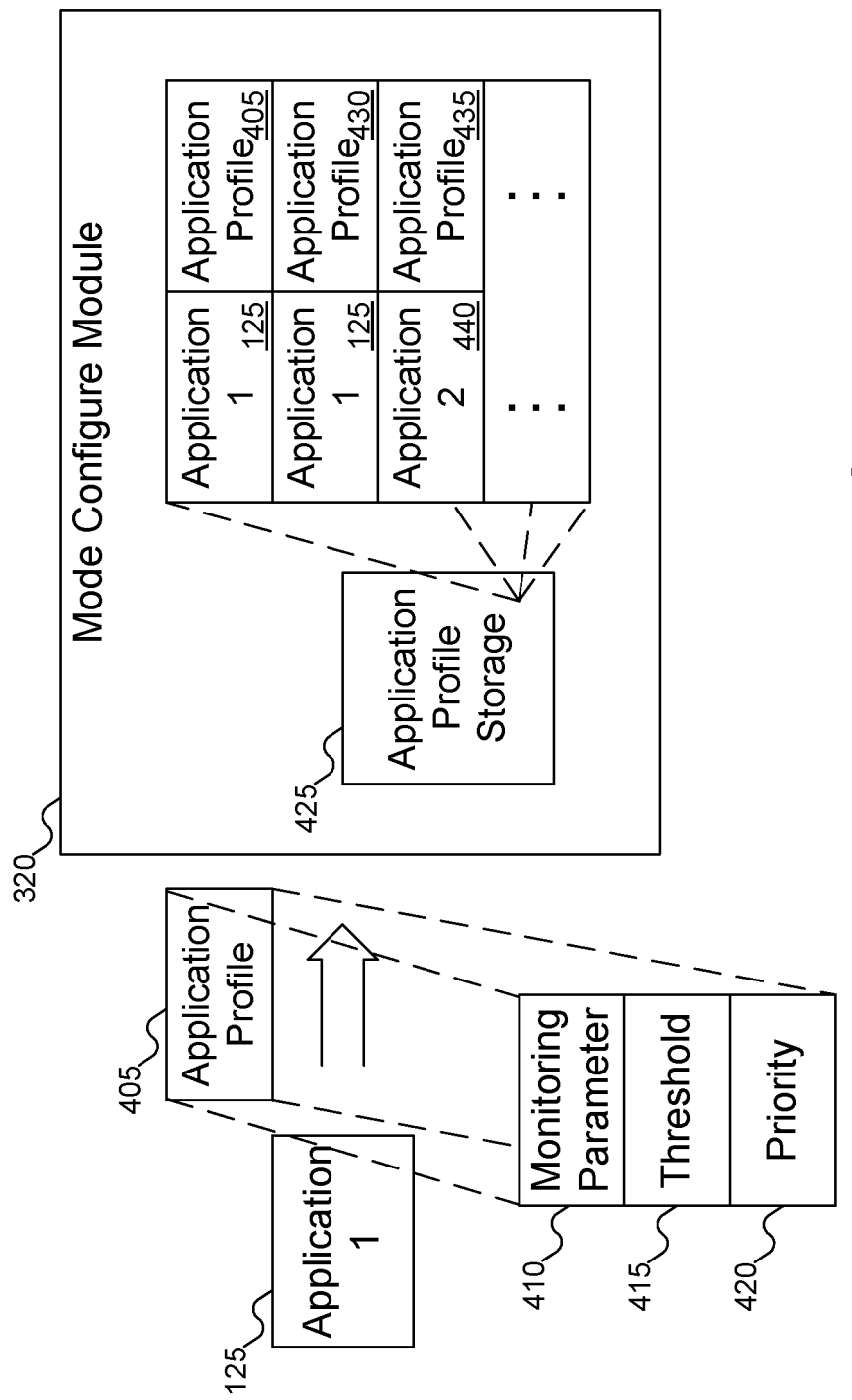
FIG. 4 shows the application of FIG. 1 interfacing with the Mode Configure Module of FIG. 3.

FIG. 4 shows application 125 of FIG. 1 interfacing with Mode Configure Module 320 of FIG. 3. Mode Configure Module 320 enables application 125 to configure the completion policy (also called an application profile) for any issued I/O commands. The monitoring of parameters and condition of completion switching may be configured based on an application's profile. Through Mode Configure Module 320, application 125 may set up the parameters that may be monitored by device driver 130. Device driver 130 may monitor parameters to determine how to let application 125 satisfy its service level agreements, and to give feedback to application 125 using Feedback Module 330 of FIG. 3, which is described further below with reference to FIG. 6.

In FIG. 4, application 125 is shown sending application profile 405 to Mode Configure Module 320. Application profile 405 may include one or more monitoring parameters 410 and switching parameter 415. Monitoring parameters 410 may be parameters about which application profile 125 desires feedback. Example parameters may include latency, TOPS, queue depth (i.e., how many I/O commands are in the command queues), and throughput (i.e., the rate at which I/O commands are processed). Switching parameter 415 enables device driver 130 to select from two or more queues for sending an I/O command to storage device 120. Switching parameter 415 may be a threshold (as shown in FIG. 4): whether the monitoring parameter appropriate to the switching parameter is above or below the threshold may be used to select which command queue will receive the I/O command. For example, application 125 might specify latency as monitoring parameter 410, and specify 0.1 milliseconds (ms) as threshold 415. Or, application 125 might specify TOPS as monitoring parameter 410, and 10,000 TOPS as threshold 415.

Application profile 405 may also specify which priority 420 of command queues are to be used for I/O commands. For example, priority 420 may specify that any I/O commands associated with application profile 405 are to be assigned priority 4, or to priority 1. Application Aware Module 325 of FIG. 3 may then use this information to select between polling and interrupt command queues of the same priority.

More generally, priority 420 may identify two or more command queues to select among. For example, depending on the condition of storage device 120 of FIG. 1, application 125 might want to have I/O commands funneled into one of two polling command queues of differing priority: switching parameter 415 may then be used to select between the two different priorities of the command queues. If priority 420 identifies more than two command queues, switching parameter 415 may specify two or more different threshold values: depending on the condition of storage device 120 of FIG. 1, Application Aware Module 325 of FIG. 3 may then select from among those identified command queues. Different application profiles may specify different thresholds based on different monitoring parameters, providing each application with the ability to control how its I/O commands are processed, independent from any other applications.

Mode Configure Module 320 may store application profile 405 in application profile storage 425. Application profile storage 425 may be part of memory 115 of FIG. 1 allocated to device driver 130 of FIG. 1. Application profile storage 425 may store any number of application profiles for any number of applications. For example, FIG. 4 shows application profile storage 425 storing three application profiles. Application profiles 405 and 430 are associated with application 125, whereas application profile 435 is associated with application 440. Device driver 130 may then use these application profiles to decide into which command queue a particular I/O command from a particular application is to be stored.

Figure 5A:
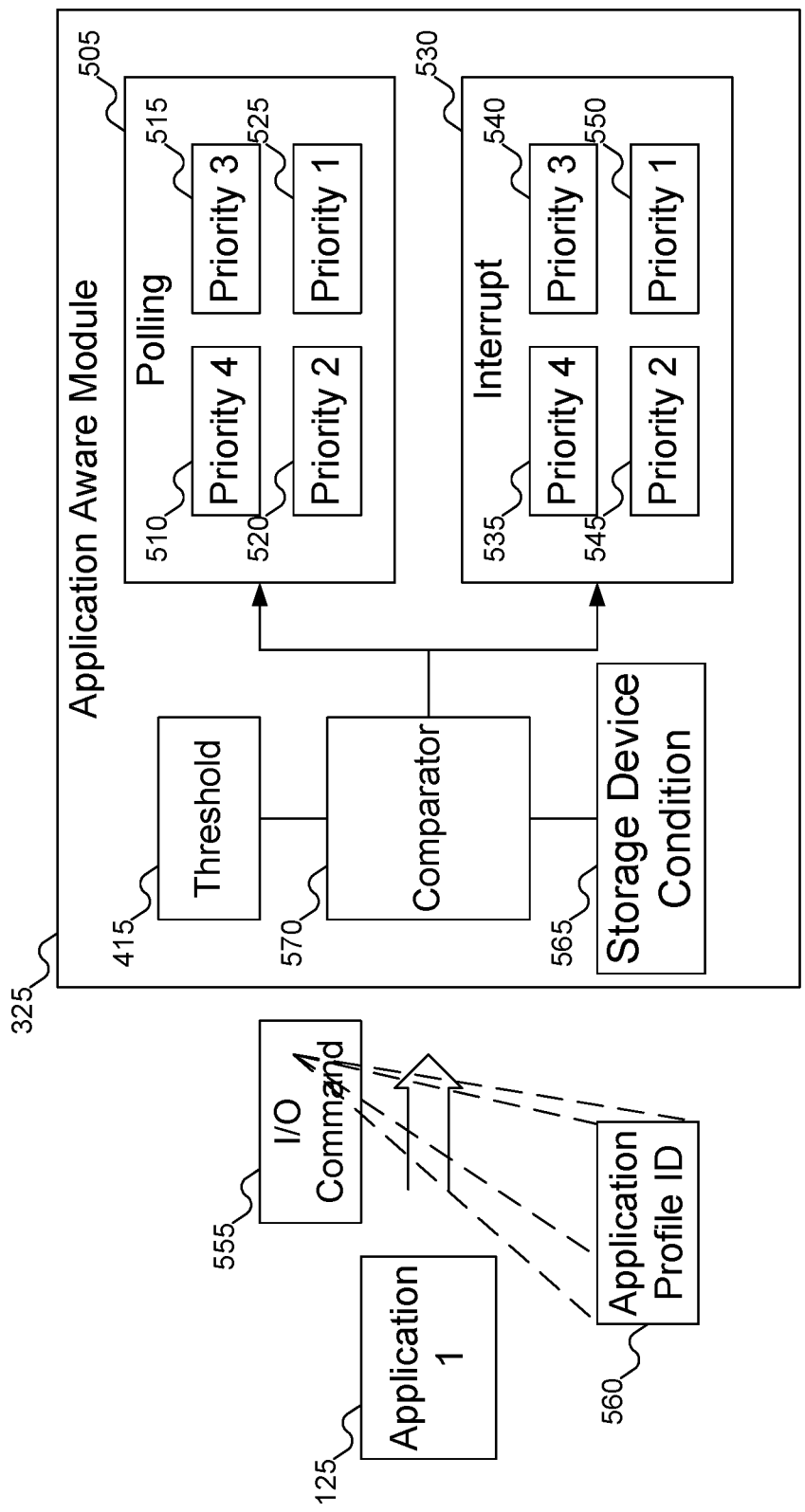
FIGS. 5A-5B show the application of FIG. 1 interfacing with the Application Aware Module of FIG. 3.
Figure 5B:
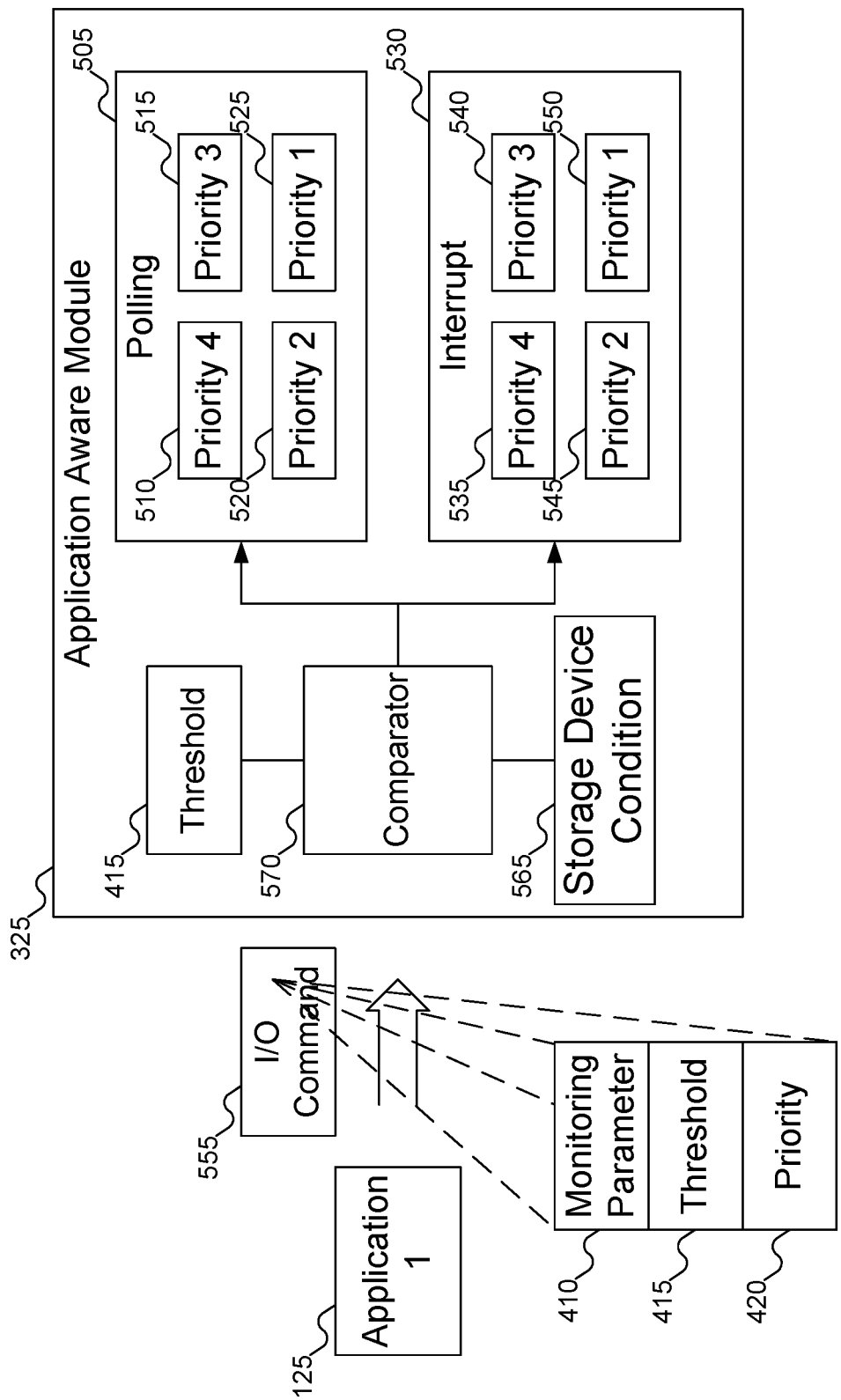

FIGS. 5A-5B show application 125 of FIG. 1 interfacing with Application Aware Module 325 of FIG. 3. Application Aware Module 325 may put I/O commands from applications into different completion handling categories (i.e., command queues) based on their latency, TOPS and I/O priority requirements. With application profile 405 of FIG. 4 as input, Application Aware Module 325 may decide whether the I/O completion handler is to be polling-based or interrupt-based.

Within either the polling category or interrupt category, there may be any number of queues. For example, within polling category 505, FIG. 5A shows four polling queues 510, 515, 520, and 525, and within interrupt category 530, FIG. 5A shows four interrupt queues 535, 540, 545, and 550. But FIG. 5A is merely an example, and polling category 505 and interrupt category 530 may have any number of queues. In addition, polling category 505 and interrupt category 530 may have different numbers of queues: for example, polling category 505 might have eight command queues while interrupt category 530 might only have four command queues.

Within each category, the various command queues may have different priorities. For example, with four command queues in polling category 505, command queue 510 may have priority 4, command queue 515 may have priority 3, command queue 520 may have priority 2, and command queue 525 may have priority 1. The priority for each command queue may control how quickly I/O commands are taken from the command queue. For example, if N represents a unit of time (e.g., 1 ms), command queue 510 may have a polling interval of N, command queue 515 may have a polling interval of 2N, command queue 520 may have a polling interval of 3N, and command queue 525 may have a polling interval of 4N. Interrupt category 530 may also have priority levels, but the priority level affects when the I/O command results are sent from storage device 120 of FIG. 1.

When application 125 sends an I/O command, such as I/O command 555, to Application Aware Module 325, application 125 may send application profile ID 560. Application profile ID 560 may specify which application profile, such as application profile 405 of FIG. 4, to use when scheduling I/O command 555. Application Aware Module 325 may then access the appropriate application profile from application profile storage 425 of FIG. 4 to use in deciding to which command queue I/O command 555 should be assigned. For example, in FIG. 5A, Application Aware Module 325 has accessed threshold 415 from application profile 405 of FIG. 4.

Application Aware Module 325 may also access storage device condition 565. Storage device condition 565 may reflect the current condition of storage device 120 of FIG. 1. More specifically, storage device condition 565 may reflect the current condition of monitored parameters 410 of FIG. 4, which may be compared against threshold 415. Comparator 570 may perform this comparison. Then, based on how storage device condition 565 compares to threshold 415, Application Aware Module 325 may select a command queue to hold I/O command 555.

As an example, assume that application profile 405 of FIG. 4 specifies latency as monitoring parameter 410, and specifies 0.1 milliseconds (ms) as threshold 415. Further assume that application 125 requests that Application Aware Module 325 of FIG. 3 choose between polling category 505 and interrupt category 530, depending on storage device condition 565. If storage device condition 565 indicates that storage device 120 of FIG. 1 is currently providing a latency below 0.1 ms, then Application Aware Module 325 of FIG. 3 may select a command queue from polling category 505; otherwise, Application Aware Module 325 may select a command queue from interrupt category 530.

Condition 565 may be determined around the time that Application Aware Module 325 receives I/O command 555 from application 125. "Around the time" may mean different things in different embodiments of the inventive concept. In some embodiments of the inventive concept, Application Aware Module 325 may determine condition 565 at the time it receives I/O command 555 from application 125. In other embodiments of the inventive concept, Application Aware Module 325 may determine condition 565 sometime shortly after it receives I/O command 555 from application 125. In yet other embodiments of the inventive concept, Application Aware Module 325 may monitor storage device 120 of FIG. 1, either continuously or at periodic intervals, for condition 565 (and other conditions in application profiles for other applications). Application Aware Module 325 may then use the most recent value for condition 565 in selecting a command queue for I/O command 555. The term "around the time" may be replaced with other language that captures a similar concept, such as "contemporaneous with".

While FIG. 5A shows a model based on application profile 405 of FIG. 4 storing indicators of what queues to use, other embodiments of the inventive concept may operate according to other principles. For example, in FIG. 5B, rather than specifying an application profile with I/O command 555, application 125 may specify monitoring parameter 410, switching parameter 415, and priority 420 directly, bypassing the need to access application profile 405 of FIG. 4 from application profile storage 425. Of course, including monitoring parameter 410, switching parameter 415, and priority 420 in each I/O command 555 requires more data than would an application profile identifier, but reduces the amount of information device driver 130 of FIG. 3 would need to store.

Embodiments of the inventive concept that combine FIGS. 5A and 5B are also possible. For example, application profile 405 of FIG. 4 might specify monitoring parameter 410 and switching parameter 415, but omit priority 420. I/O command 555 may then specify priority 420. Such an embodiment of the inventive concept enables using application profile 405 of FIG. 4 with multiple different priorities. Or, application profile 405 might specify priority 420 but omit monitoring parameter 410 and switching parameter 415. Such an embodiment of the inventive concept enables application 125 to use the same priority 420 but change how Application Aware Module 325 selects between the command queues.

FIG. 6 shows application 125 of FIG. 1 interfacing with Dynamic Feedback Module 330 of FIG. 3. Dynamic Feedback Module 330 may provide feedback and performance prediction to application 125, enabling application 125 to make dynamic adjustments for submission and completion policies. Dynamic Feedback Module 330 may provide values for the monitored parameters, such as TOPS and latency, to application 125. The application may adjust the I/O command submission pattern for congestion control based on the feedback values.

In addition, Dynamic Feedback Module 330 may provide performance predictions to application 125 based on current device statistics. Application 125 may use this information to dynamically adjust its behavior and have an idea how to plan future I/O commands to meet its service level agreement.

In FIG. 6, Dynamic Feedback Module 330 may receive information from storage device 120. This information may include the latency, TOPS, throughput, and other conditions of storage device 120. Alternatively, Dynamic Feedback Module 330 may track these statistics based on the information device driver 130 of FIG. 1 sends to and receives from storage device 120. For example, if device driver 130 of FIG. 1 receives data back from storage device 120 0.1 ms after sending the associated I/O command, Dynamic Feedback Module 330 may calculate the latency (more typically, Dynamic Feedback Module 330 would track the latency of a number of individual I/O commands and calculate the arithmetic mean of the latencies of those I/O commands). TOPS, throughput, and other desired statistics may be similarly calculated. Other statistics that may be provided to applications 125, 305, 310, and 315 may include the minimum and maximum latency for each command queue and the minimum and maximum TOPS for each command queue.

Dynamic Feedback Module 330 may also determine such statistics (whether requested from storage device 120 or calculated by Dynamic Feedback Module 330) for each command queue. Since different command queues may have different priorities, the different command queues are likely to have different statistics. By separating statistics by command queue, Dynamic Feedback Module 330 may provide applications 125, 305, 310, and 315 with more meaningful information.

As described above with reference to FIG. 4, applications 125, 305, 310, and 315 may specify monitoring parameters 410 that the application wants tracked. So, while Dynamic Feedback Module 330 may track all statistics for storage device 120, Dynamic Feedback Module 330 may provide only those statistics requested by the application. So, monitored parameters 605 may provide the statistics desired by application 125, monitored parameters 610 may provide the statistics desired by application 305, monitored parameters 615 may provide the statistics desired by application 310, and monitored parameters 620 may provide the statistics desired by application 315.

Dynamic Feedback Module 330 may also include performance predictor 625. Performance predictor 625 may use a heuristic algorithm to give applications 125, 305, 310, and 315 information about what the expected performance would be if the applications changed their application profiles. For example, performance predictor 625 may run estimations of what monitored parameters 605 might be if application 125 made a change to its application profile. Dynamic Feedback Module 330 may then provide these performance predictions 630, 635, 640, and 645 to applications 125, 305, 310, and 315. Performance predictions 630, 635, 640, and 645 may provide applications 125, 305, 310, and 315 with information that applications 125, 305, 310, and 315 would be unable to determine on their own, as the applications do not have access to the command queues to know information about I/O commands from other applications (which may impact their I/O commands).

Figure 7:
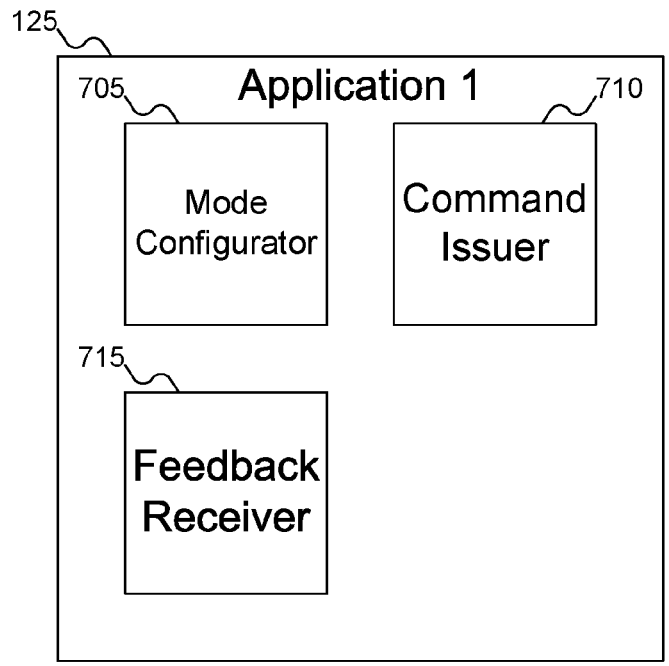
FIG. 7 shows details of the application of FIG. 1.

FIG. 7 shows details of application 125 of FIG. 1. In FIG. 7, application 125 may include mode configurator 705, command issuer 710, and feedback receiver 715. Mode configurator 705 may generate application profile 405 of FIG. 4, for transmission to Mode Configure Module 320 of FIG. 3. Command issuer 710 may issue I/O commands to device driver 130 of FIG. 1. Command issuer 710 may also attach to the I/O commands any information needed for Application Aware Module 325 of FIG. 3 to know how to process I/O command 555 of FIG. 5A. For example, command issuer 710 may attach an identifier of application profile 405 of FIG. 4 to the I/O command 555 of FIG. 5A, or information such as monitoring parameter 410 of FIG. 4, switching parameter 415 of FIG. 4, and/or priority 420 of FIG. 4. Finally, feedback receiver 715 may receive feedback from Dynamic Feedback Module 330 of FIG. 3 about the operation of storage device 120 of FIG. 1.

Figure 8:
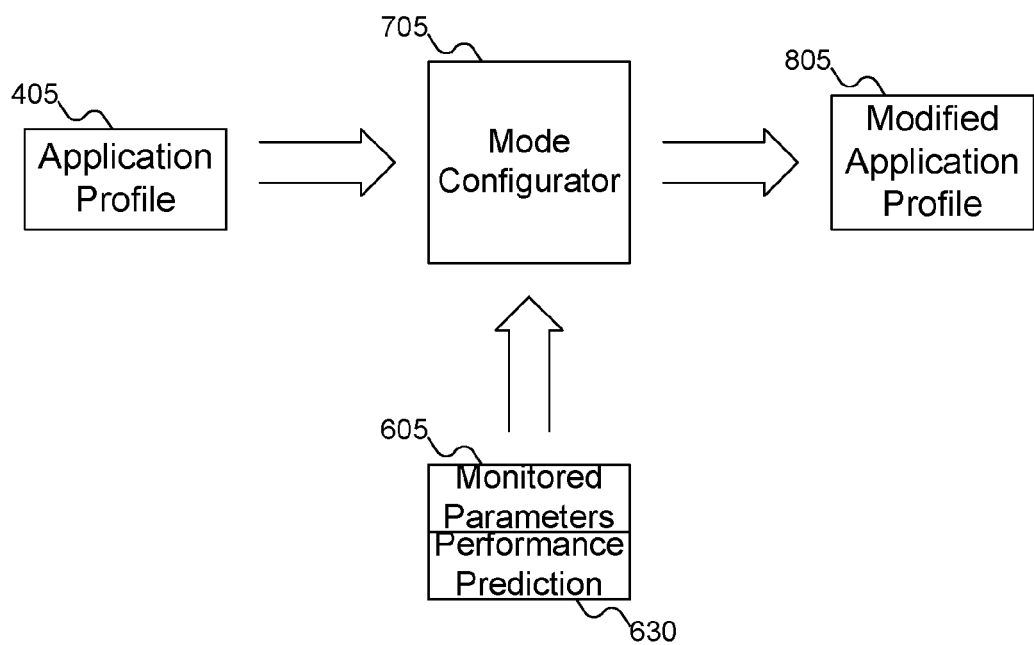
FIG. 8 shows details of the mode configurator of FIG. 7.

FIG. 8 shows details of mode configurator 705 of FIG. 7. Aside from generating application profile 405 in the first instance, mode configurator 705 may also modify an application profile based on received feedback. As shown in FIG. 8, mode configurator 705 may receive application profile 405, monitored parameters 605, and/or performance prediction 630. Using this information, mode configurator 705 may generate modified application profile 805, which may then be sent to Mode Configure Module 325 of FIG. 3 to replace older application profile 405.

Figure 9A:
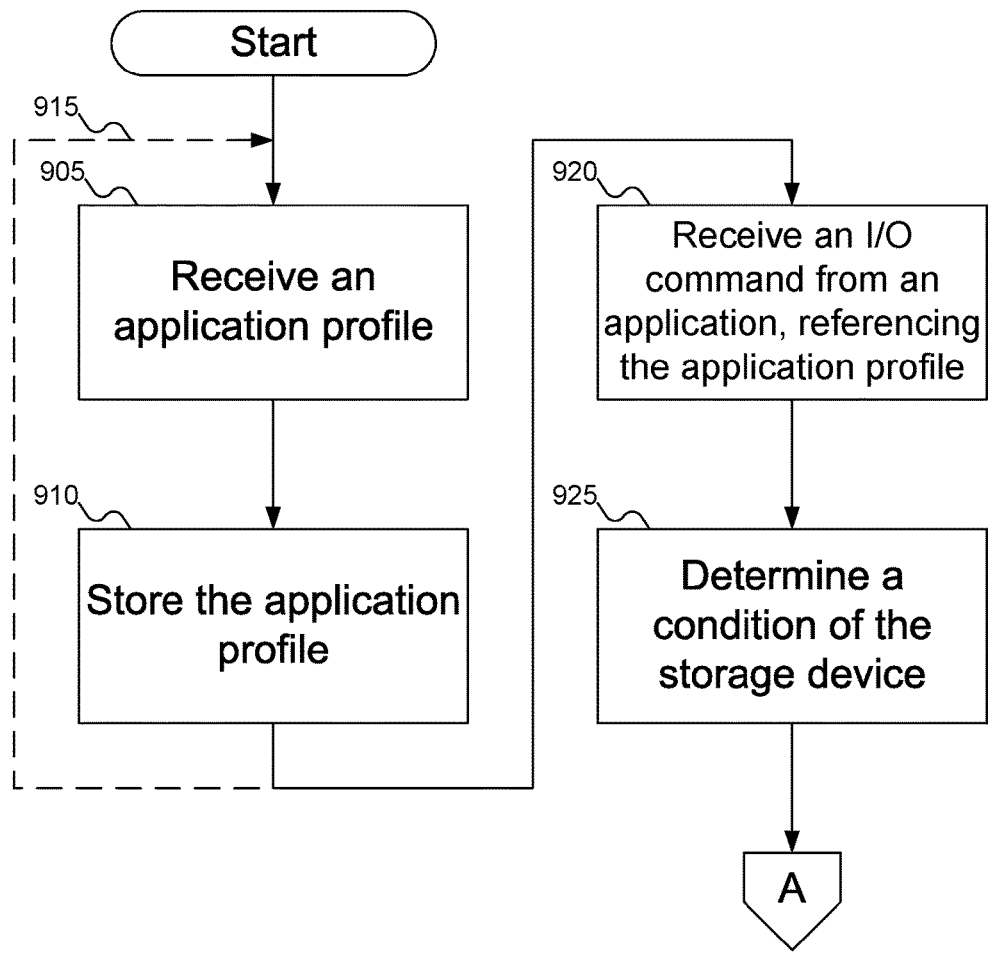
FIGS. 9A-9B show a flowchart of an example procedure for the user space device driver of FIG. 3 to process I/O commands from the application of FIG. 1, according to an embodiment of the inventive concept.
Figure 9B:
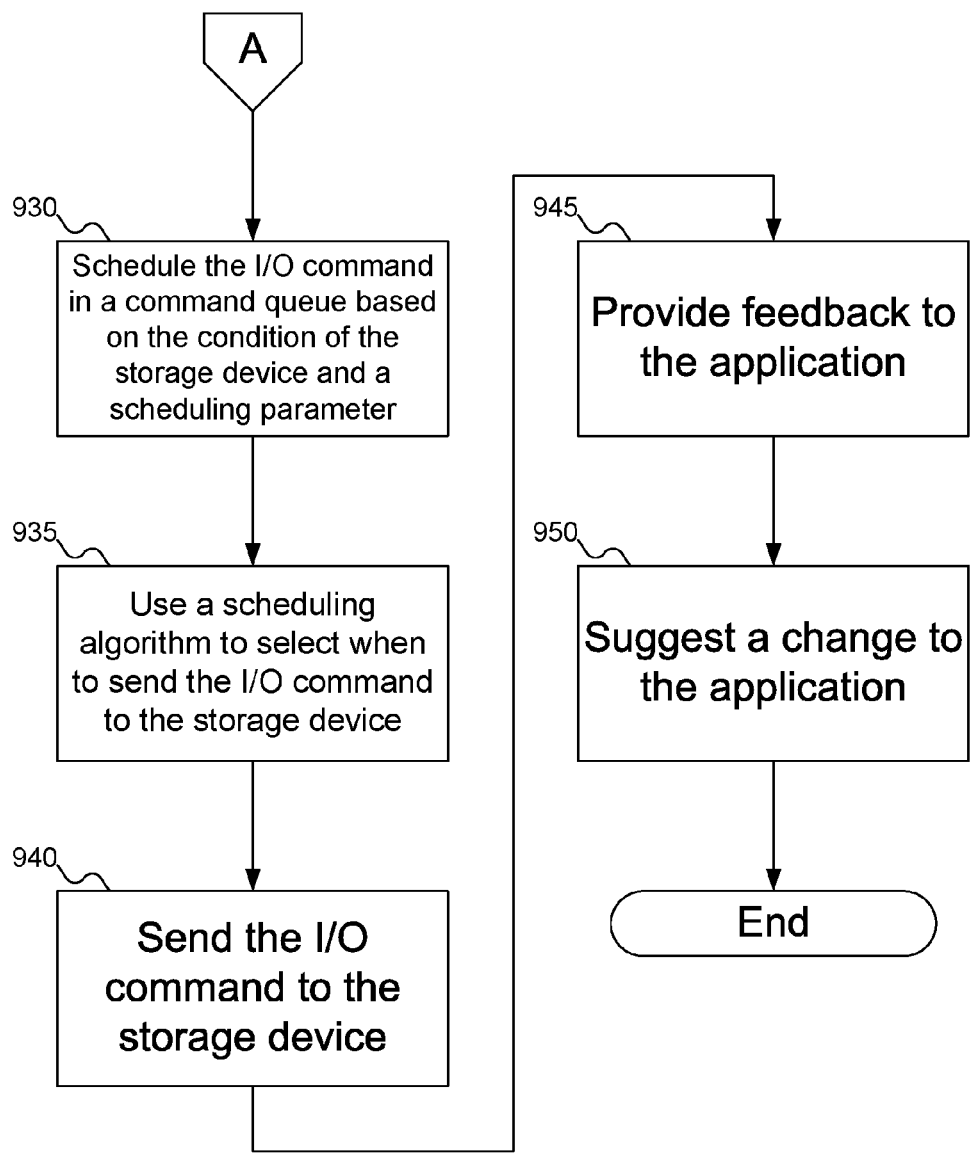

FIGS. 9A-9B show a flowchart of an example procedure for user space device driver 130 of FIG. 3 to process I/O command 555 of FIG. 5A from application 125 of FIG. 1, according to an embodiment of the inventive concept. In FIG. 9A, at block 905, Mode Configure Module 320 of FIG. 3 may receive application profile 405 of FIG. 4 from application 125 of FIG. 1. At block 910, Mode Configure Module 320 of FIG. 3 may store application profile 405 of FIG. 4 in application profile storage 425 of FIG. 4. Blocks 905 and 910 may be repeated as often as needed, as shown by dashed arrow 915: this repetition enables receiving additional application profiles from other applications as well as from application 125 of FIG. 1. At block 920, Application Aware Module 325 of FIG. 3 may receive I/O command 555 of FIG. 5A from application 125 of FIG. 1. At block 925, Application Aware Module 325 of FIG. 3 may determine the condition of storage device 120 of FIG. 1.

At block 930 (FIG. 9B), Application Aware Module 325 of FIG. 3 may schedule I/O command 555 of FIG. 5A in one of the command queues. This scheduling may consider both application profile 405 of FIG. 4 and storage device condition 565 of FIG. 5A. At block 935, scheduler 335 of FIG. 3 may schedule when to send I/O command 555 of FIG. 5 from the command queue to storage device 120 of FIG. 1. At block 940, when the scheduled time arrives, Application Aware Module 325 of FIG. 3 may send I/O command 555 of FIG. 5A to storage device 120 of FIG. 1. At block 945, Dynamic Feedback Module 330 of FIG. 3 may provide feedback information, such as monitored parameters 605 of FIG. 6, to application 125 of FIG. 1. Finally, at block 950, Dynamic Feedback Module 330 of FIG. 3 may suggest a change to application 125 of FIG. 1, via performance prediction 630 of FIG. 6.

Figure 10:
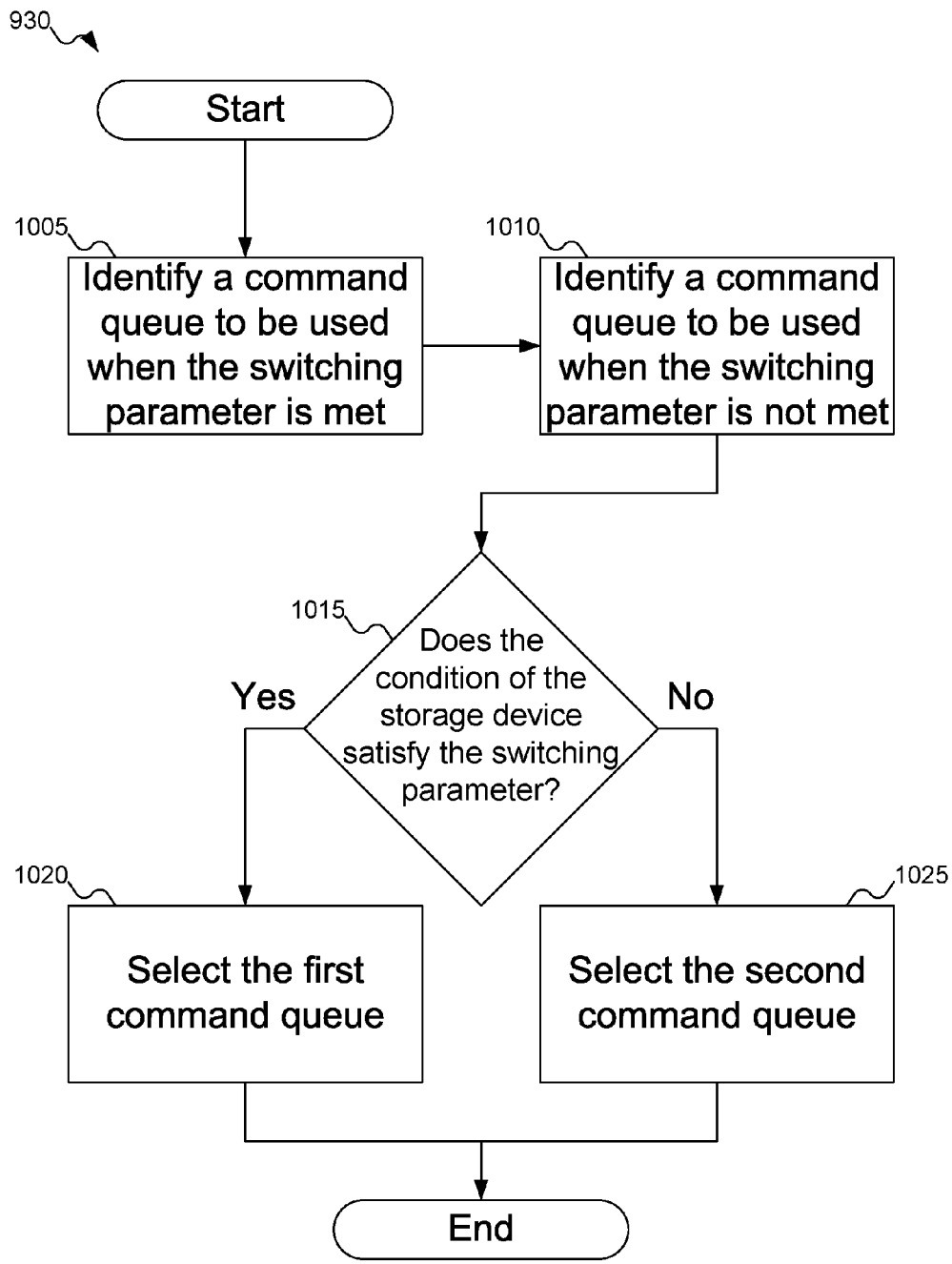
FIG. 10 shows a flowchart of an example procedure for the user space device driver of FIG. 3 to schedule an input/output (I/O) command, according to an embodiment of the inventive concept.

FIG. 10 shows a flowchart of an example procedure for user space device driver 130 of FIG. 3 to schedule input/output (I/O) command 555 of FIG. 5A, according to an embodiment of the inventive concept. In FIG. 10, at block 1005, Application Aware Module 325 of FIG. 3 may identify a command queue to use when switching parameter 415 of FIG. 4 is met (i.e., when the condition specified by switching parameter 415 of FIG. 4 is satisfied). At block 1010, Application Aware Module 325 of FIG. 3 may identify a command queue to use when switching parameter 415 of FIG. 4 is not met (i.e., when the condition specified by switching parameter 415 of FIG. 4 is not satisfied). At block 1015, Application Aware Module 325 of FIG. 3 may compare storage device condition 565 of FIG. 5A with switching parameter 415 of FIG. 4, to determine whether switching parameter 415 of FIG. 4 is met. If switching parameter 415 of FIG. 4 is met, then at block 1020 the first command queue is selected; otherwise, at block 1025 the second command queue is selected.

While FIG. 10 describes selecting between only two command queues, the flowchart of FIG. 10 may be generalized to select from among any number of command queues. For example, additional blocks similar to blocks 1005 and 1010 may be included to identify other command queues, and block 1015 may be generalized to consider multiple switching parameters 415 of FIG. 4 to cover all possible command queues.

Figure 11:
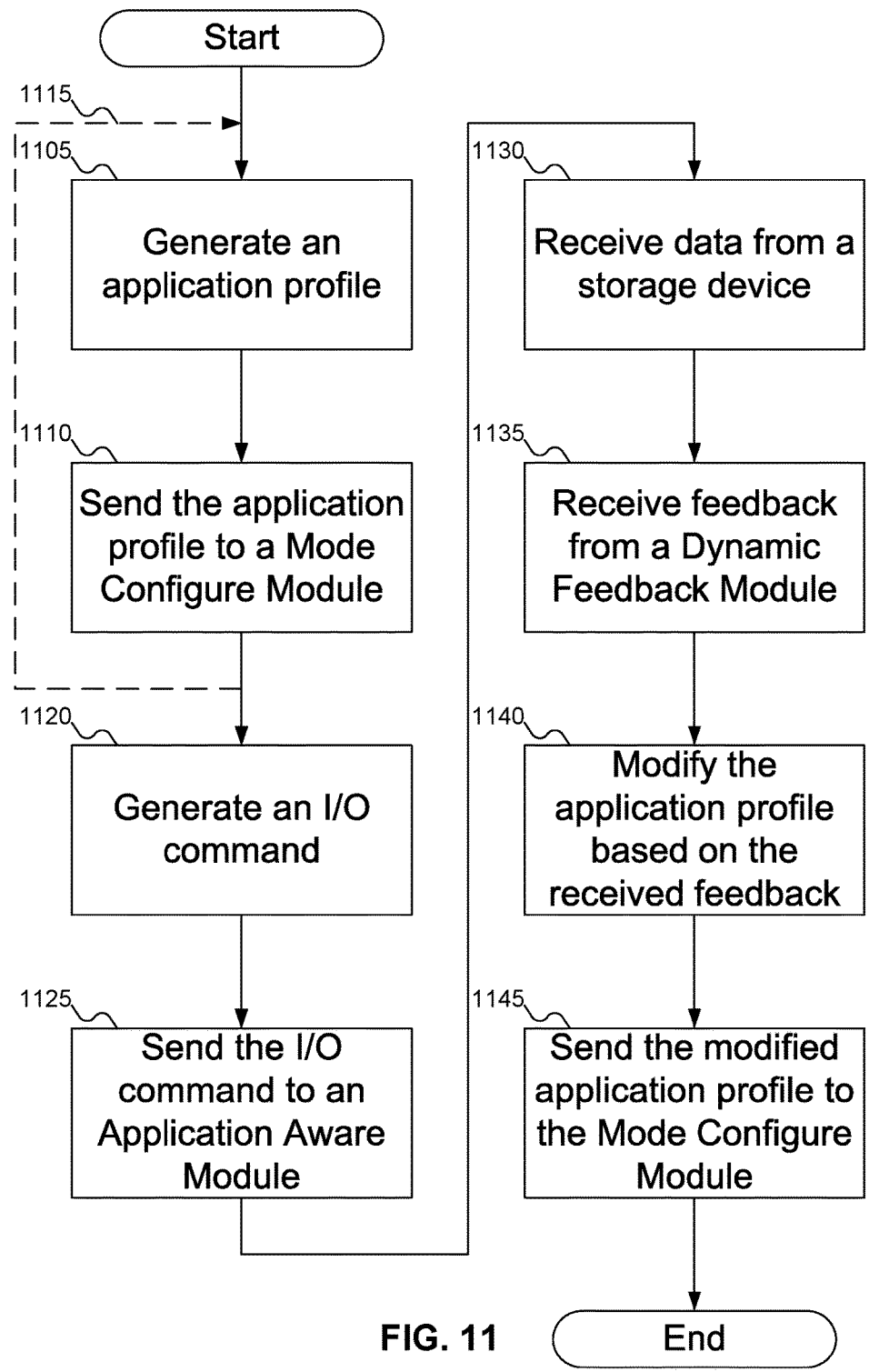
FIG. 11 shows a flowchart of an example procedure for the application of FIG. 1 to interact with the user space device driver of FIG. 3, according to an embodiment of the inventive concept.

FIG. 11 shows a flowchart of an example procedure for application 125 of FIG. 1 to interact with user space device driver 130 of FIG. 3, according to an embodiment of the inventive concept. In FIG. 11, at block 1105, mode configurator 705 of FIG. 7 may generate application profile 415 of FIG. 4. At block 1110, application 125 of FIG. 1 may send application profile 415 of FIG. 4 to Mode Configure Module 320 of FIG. 3. Blocks 1105 and 1110 may be repeated as often as needed, as shown by dashed arrow 1115: this repetition enables application 125 of FIG. 1 to send additional application profiles to Mode Configure Module 325 of FIG. 3.

At block 1120, application 125 of FIG. 1 may generate I/O command 555 of FIG. 5A. At block 1125, application 125 of FIG. 1 may send I/O command 555 of FIG. 5A to Application Aware Module 325 of FIG. 3. At block 1130, application 125 of FIG. 1 may receive data from storage device 120 of FIG. 1, responsive to I/O command 555 of FIG. 5A.

At block 1135, feedback receiver 715 of FIG. 7 may receive feedback, such as monitored parameters 605 of FIG. 6 and/or performance prediction 630 of FIG. 6, from Dynamic Feedback Module 330 of FIG. 3. At block 1140, mode configurator 705 of FIG. 7 may modify application profile 405 of FIG. 4, based on the received feedback, to produce modified application profile 805 of FIG. 8. At block 1145, application 125 of FIG. 1 may send modified application profile 805 of FIG. 8 to Mode Configure Module 320 of FIG. 3.

In FIGS. 9A-11, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:
  a computer (105);
  a processor (110);
  a memory (115);
  a storage device (120);
  an application (125, 305, 310, 315) stored in the memory (115), the application (125, 305, 310, 315) capable of being executed by the processor (110); and
  a device driver (130), including:
    a Mode Configure Module (320) to receive an application profile (405, 430, 435); and
    an Application Aware Module (325) to receive an input/output (I/O) command (555) from the application (125, 305, 310, 315) and to assign the I/O command (555) to one of a plurality of command queues (510, 515, 520, 525, 535, 540, 545, 550) using the application profile (405, 430, 435),
  wherein the storage device (120) is operative to receive the I/O command (555) from the one of the plurality of command queues (510, 515, 520, 525, 535, 540, 545, 550).

Statement 2. An embodiment of the inventive concept includes a system according to statement 1, wherein the storage device (120) includes a Solid State Drive (SSD).

Statement 3. An embodiment of the inventive concept includes a system according to statement 1, wherein:
  the application profile (405, 430, 435) includes a monitoring parameter (410) and a switching parameter (415); and
  the Application Aware Module (325) is operative to assign the I/O command (555) to the one of the plurality of command queues (510, 515, 520, 525, 535, 540, 545, 550) based on the switching parameter (415) and a condition (565) of the storage device (120) specified by the monitoring parameter (410).

Statement 4. An embodiment of the inventive concept includes a system according to statement 3, wherein:
  the monitoring parameter (410) is drawn from a set including latency, I/O instructions Per Second (IOPS), and a priority; and
  the switching parameter (415) includes a threshold (415) for the monitoring parameter (410).

Statement 5. An embodiment of the inventive concept includes a system according to statement 4, wherein the Application Aware Module (325) is operative to assign the I/O command (555) to the one of a plurality of command queues (510, 515, 520, 525, 535, 540, 545, 550) using the application profile (405, 430, 435) based on whether at least one condition (565) of the storage device (120) exceeds the threshold (415) for the monitoring parameter (410).

Statement 6. An embodiment of the inventive concept includes a system according to statement 1, wherein:

the Mode Configure Module (320) is operative to receive a plurality of application profiles (405, 430, 435) for the application (125, 305, 310, 315); and the Application Aware Module (325) is operative to receive the I/O command (555) and a selection (560) of one of the application profiles (405, 430, 435) from the application (125, 305, 310, 315).

Statement 7. An embodiment of the inventive concept includes a system according to statement 1, wherein the Application Aware Module (325) is operative to receive the I/O command (555) and a priority (420) from the application (125, 305, 310, 315).

Statement 8. An embodiment of the inventive concept includes a system according to statement 7, wherein the Application Aware Module (325) is further operative to assign the I/O command (555) to one of a plurality of command queues (510, 515, 520, 525, 535, 540, 545, 550) with the priority (420).

Statement 9. An embodiment of the inventive concept includes a system according to statement 1, wherein the plurality of command queues (510, 515, 520, 525, 535, 540, 545, 550) includes at least one command polling queue (510, 515, 520, 525) and at least one command interrupt queue (535, 540, 545, 550).

Statement 10. An embodiment of the inventive concept includes a system according to statement 9, wherein the Application Aware Module (325) is operative to assign the I/O command (555) to one of a command polling queue (510, 515, 520, 525) and a command interrupt queue (535, 540, 545, 550) of equal priority using the application profile (405, 430, 435).

Statement 11. An embodiment of the inventive concept includes a system according to statement 1, wherein the Application Aware Module (325) is operative to assign the I/O command (555) to select between a first command queue of the plurality of command queues (510, 515, 520, 525, 535, 540, 545, 550), the first command queue including a first priority, and a second command queue of the plurality of command queues (510, 515, 520, 525, 535, 540, 545, 550), the second command queue including a second priority, the second priority different from the first priority, using the application profile (405, 430, 435).

Statement 12. An embodiment of the inventive concept includes a system according to statement 1, wherein the device driver (130) further includes a Dynamic Feedback Module (330) to provide feedback (605, 630, 610, 635, 615, 640, 620, 645) to the application (125, 305, 310, 315) regarding the monitoring parameter (410).

Statement 13. An embodiment of the inventive concept includes a system according to statement 12, wherein the feedback (605, 630, 610, 635, 615, 640, 620, 645) includes a suggestion (630, 635, 640, 645) to the application (125, 305, 310, 315) regarding a change to at least one of the monitoring parameter (410) and the switching parameter (415) to improve performance.

Statement 14. An embodiment of the inventive concept includes a system according to statement 13, wherein the change is drawn from a set including I/O congestion, an I/O issuing model, and an I/O completion model.

Statement 15. An embodiment of the inventive concept includes a system according to statement 12, wherein the feedback (605, 630, 610, 635, 615, 640, 620, 645) further includes feedback (605, 630, 610, 635, 615, 640, 620, 645) to the application (125, 305, 310, 315) about the one of the plurality of command queues (510, 515, 520, 525, 535, 540, 545, 550).

Statement 16. An embodiment of the inventive concept includes a system according to statement 15, the feedback (605, 630, 610, 635, 615, 640, 620, 645) includes a minimum latency of the one of the plurality of command queues (510, 515, 520, 525, 535, 540, 545, 550), a maximum latency of the one of the plurality of command queues (510, 515, 520, 525, 535, 540, 545, 550), a minimum I/O instructions Per Second (IOPS) of the one of the plurality of command queues (510, 515, 520, 525, 535, 540, 545, 550), and a maximum TOPS of the one of the plurality of command queues (510, 515, 520, 525, 535, 540, 545, 550).

Statement 17. An embodiment of the inventive concept includes a system according to statement 1, wherein the device driver (130) includes a scheduler (335) to schedule delivery of the I/O command (555) to the storage device (120).

Statement 18. An embodiment of the inventive concept includes a system according to statement 17, wherein the scheduler (335) includes a round robin scheduler (335).

Statement 19. An embodiment of the inventive concept includes a system according to statement 17, wherein the scheduler (335) includes a prioritizing scheduler (335), where for a queue (510, 515, 520, 525, 535, 540, 545, 550) of a given priority, the prioritizing scheduling algorithm selects I/O commands (555) from that queue (510, 515, 520, 525, 535, 540, 545, 550) more frequently than for any queue (510, 515, 520, 525, 535, 540, 545, 550) of a lower priority than the given priority.

Statement 20. An embodiment of the inventive concept includes a device driver (130), comprising:

a Mode Configure Module (320) to receive an application profile (405, 430, 435); and an Application Aware Module (325) to receive an input/output (I/O) command (555) from the application (125, 305, 310, 315) and to assign the I/O command (555) to one of a plurality of command queues (510, 515, 520, 525, 535, 540, 545, 550) using the application profile (405, 430, 435), wherein a storage device (120) is operative to receive the I/O command (555) from the one of the plurality of command queues (510, 515, 520, 525, 535, 540, 545, 550).

Statement 21. An embodiment of the inventive concept includes a device driver (130) according to statement 20, wherein:

the application profile (405, 430, 435) includes a monitoring parameter (410) and a switching parameter (415); and the Application Aware Module (325) is operative to assign the I/O command (555) to the one of the plurality of command queues (510, 515, 520, 525, 535, 540, 545, 550) based on the switching parameter (415) and a condition (565) of the storage device (120) specified by the monitoring parameter (410).

Statement 22. An embodiment of the inventive concept includes a device driver (130) according to statement 21, wherein:

the monitoring parameter (410) is drawn from a set including latency, I/O instructions Per Second (IOPS), and a priority; and the switching parameter (415) includes a threshold (415) for the monitoring parameter (410).

Statement 23. An embodiment of the inventive concept includes a device driver (130) according to statement 22, wherein the Application Aware Module (325) is operative to assign the I/O command (555) to the one of a plurality of command queues (510, 515, 520, 525, 535, 540, 545, 550) using the application profile (405, 430, 435) based on whether at least one condition (565) of the storage device (120) exceeds the threshold (415) for the monitoring parameter (410).

Statement 24. An embodiment of the inventive concept includes a device driver (130) according to statement 20, wherein:

the Mode Configure Module (320) is operative to receive a plurality of application profiles (405, 430, 435) for the application (125, 305, 310, 315); and the Application Aware Module (325) is operative to receive the I/O command (555) and a selection (560) of one of the application profiles (405, 430, 435) from the application (125, 305, 310, 315).

Statement 25. An embodiment of the inventive concept includes a device driver (130) according to statement 20, wherein the Application Aware Module (325) is operative to receive the I/O command (555) and a priority (420) from the application (125, 305, 310, 315).

Statement 26. An embodiment of the inventive concept includes a device driver (130) according to statement 25, wherein the Application Aware Module (325) is further operative to assign the I/O command (555) to one of a plurality of command queues (510, 515, 520, 525, 535, 540, 545, 550) with the priority (420).

Statement 27. An embodiment of the inventive concept includes a device driver (130) according to statement 20, wherein the plurality of command queues (510, 515, 520, 525, 535, 540, 545, 550) includes at least one command polling queue (510, 515, 520, 525) and at least one command interrupt queue (535, 540, 545, 550).

Statement 28. An embodiment of the inventive concept includes a device driver (130) according to statement 27, wherein the Application Aware Module (325) is operative to assign the I/O command (555) to one of a command polling queue (510, 515, 520, 525) and a command interrupt queue (535, 540, 545, 550) of equal priority using the application profile (405, 430, 435).

Statement 29. An embodiment of the inventive concept includes a device driver (130) according to statement 20, wherein the Application Aware Module (325) is operative to assign the I/O command (555) to select between a first command queue of the plurality of command queues (510, 515, 520, 525, 535, 540, 545, 550), the first command queue including a first priority, and a second command queue of the plurality of command queues (510, 515, 520, 525, 535, 540, 545, 550), the second command queue including a second priority, the second priority different from the first priority, using the application profile (405, 430, 435).

Statement 30. An embodiment of the inventive concept includes a device driver (130) according to statement 20, wherein the device driver (130) further includes a Dynamic Feedback Module (330) to provide feedback (605, 630, 610, 635, 615, 640, 620, 645) to the application (125, 305, 310, 315) regarding the monitoring parameter (410).

Statement 31. An embodiment of the inventive concept includes a device driver (130) according to statement 30, wherein the feedback (605, 630, 610, 635, 615, 640, 620, 645) includes a suggestion (630, 635, 640, 645) to the application (125, 305, 310, 315) regarding a change to at least one of the monitoring parameter (410) and the switching parameter (415) to improve performance.

Statement 32. An embodiment of the inventive concept includes a device driver (130) according to statement 31, wherein the change is drawn from a set including I/O congestion, an I/O issuing model, and an I/O completion model.

Statement 33. An embodiment of the inventive concept includes a device driver (130) according to statement 30, wherein the feedback (605, 630, 610, 635, 615, 640, 620, 645) further includes feedback (605, 630, 610, 635, 615, 640, 620, 645) to the application (125, 305, 310, 315) about the one of the plurality of command queues (510, 515, 520, 525, 535, 540, 545, 550).

Statement 34. An embodiment of the inventive concept includes a device driver (130) according to statement 33, the feedback (605, 630, 610, 635, 615, 640, 620, 645) includes a minimum latency of the one of the plurality of command queues (510, 515, 520, 525, 535, 540, 545, 550), a maximum latency of the one of the plurality of command queues (510, 515, 520, 525, 535, 540, 545, 550), a minimum I/O instructions Per Second (IOPS) of the one of the plurality of command queues (510, 515, 520, 525, 535, 540, 545, 550), and a maximum TOPS of the one of the plurality of command queues (510, 515, 520, 525, 535, 540, 545, 550).

Statement 35. An embodiment of the inventive concept includes a device driver (130) according to statement 20, wherein the device driver (130) includes a scheduler (335) to schedule delivery of the I/O command (555) to the storage device (120).

Statement 36. An embodiment of the inventive concept includes a device driver (130) according to statement 35, wherein the scheduler (335) includes a round robin scheduler (335).

Statement 37. An embodiment of the inventive concept includes a device driver (130) according to statement 35, wherein the scheduler (335) includes a prioritizing scheduler (335), where for a command queue of a given priority, the prioritizing scheduling algorithm selects I/O commands (555) from that command queue more frequently than for any command queue of a lower priority than the given priority.

Statement 38. An embodiment of the inventive concept includes an application (125, 305, 310, 315), comprising:

a mode configurator (705) to send an application profile (405, 430, 435) to a Mode Configure Module (320); and a command issuer (710) to send an input/output (I/O) command (555) and the application profile (405, 430, 435) to an Application Aware Module (325).

Statement 39. An embodiment of the inventive concept includes an application (125, 305, 310, 315) according to statement 38, wherein:

the mode configurator (705) is operative to send a plurality of application profiles (405, 430, 435) to the Mode Configure Module (320).

Statement 40. An embodiment of the inventive concept includes an application (125, 305, 310, 315) according to statement 38, further comprising a feedback receiver (715) to receive feedback (605, 630, 610, 635, 615, 640, 620, 645) from a Dynamic Feedback Module (330).

Statement 41. An embodiment of the inventive concept includes an application (125, 305, 310, 315) according to statement 40, wherein the mode configurator (705) is operative to send a modified application profile (805) to the Mode Configure Module (320) responsive to the feedback (605, 630, 610, 635, 615, 640, 620, 645).

Statement 42. An embodiment of the inventive concept includes a method, comprising:

receiving (905) an application profile (405, 430, 435) from an application (125, 305, 310, 315) at a storage device (120), the application profile (405, 430, 435) including a monitoring parameter (410) and a switching parameter (415);

storing (910) the application profile (405, 430, 435) in the storage device (120);

receiving (920) an input/output (I/O) command (555) at the storage device (120), the I/O command (555) including the application profile (405, 430, 435);

determining (925) at least one condition (565) of the storage device (120) around the time the storage device (120) receives the I/O command (555), the at least one condition (565) based on the monitoring parameter (410); and scheduling (930) the I/O command (555) in one of a plurality of command queues (510, 515, 520, 525, 535, 540, 545, 550) responsive to the at least one condition (565) of the storage device (120) and the switching parameter (415).

Statement 43. An embodiment of the inventive concept includes a method according to statement 42, wherein:

receiving (905) an application profile (405, 430, 435) from an application (125, 305, 310, 315) at a storage device (120) includes receiving (905) the application profile (405, 430, 435) from an application (125, 305, 310, 315) at a Solid State Drive (SSD);

storing (910) the application profile (405, 430, 435) in the storage device (120) includes storing (910) the application profile (405, 430, 435) in the SSD;

receiving (920) an I/O command (555) at the storage device (120) includes receiving (920) the I/O command (555) at the SSD; and determining (925) at least one condition (565) of the storage device (120) around the time the storage device (120) receives the I/O command (555) includes determining (925) the at least one condition (565) of the SSD around the time the SSD receives the I/O command (555), the at least one condition (565) based on the monitoring parameter (410).

Statement 44. An embodiment of the inventive concept includes a method according to statement 42, wherein receiving (905) an application profile (405, 430, 435) from an application (125, 305, 310, 315) at a storage device (120) includes receiving (905) the application profile (405, 430, 435) from the application (125, 305, 310, 315) at the storage device (120), the application profile (405, 430, 435) including the monitoring parameter (410) and the switching parameter (415), the monitoring parameter (410) drawn from a set including latency, I/O instructions Per Second (IOPS), and a priority, the switching parameter (415) including a threshold (415) for the monitoring parameter (410).

Statement 45. An embodiment of the inventive concept includes a method according to statement 44, wherein scheduling (930) the I/O command (555) in one of a plurality of command queues (510, 515, 520, 525, 535, 540, 545, 550) includes selecting (1020, 1025) one of the plurality of command queues (510, 515, 520, 525, 535, 540, 545, 550) based on whether the at least one condition (565) of the storage device (120) exceeds the threshold (415) for the monitoring parameter (410).

Statement 46. An embodiment of the inventive concept includes a method according to statement 42, wherein:

receiving (905) an application profile (405, 430, 435) from an application (125, 305, 310, 315) at a storage device (120) includes receiving (905, 915) a plurality of application profiles (405, 430, 435) from the application (125, 305, 310, 315) at the storage device (120); and receiving (920) an I/O command (555) at the storage device (120) includes receiving (920) the I/O command (555) at the storage device (120), the I/O command (555) including one of the plurality of application profiles (405, 430, 435).

Statement 47. An embodiment of the inventive concept includes a method according to statement 42, wherein receiving (920) an I/O command (555) at the storage device (120) includes receiving (920) the I/O command (555) at the storage device (120), the application profile (405, 430, 435) including a priority.

Statement 48. An embodiment of the inventive concept includes a method according to statement 47, wherein scheduling (930) the I/O command (555) in one of a plurality of command queues (510, 515, 520, 525, 535, 540, 545, 550) responsive to the at least one condition (565) of the storage device (120) and the switching parameter (415) includes scheduling (930) the I/O command (555) in one of a plurality of command queues (510, 515, 520, 525, 535, 540, 545, 550) with the priority.

Statement 49. An embodiment of the inventive concept includes a method according to statement 42, wherein scheduling (930) the I/O command (555) in one of a plurality of command queues (510, 515, 520, 525, 535, 540, 545, 550) includes scheduling (930) the I/O command (555) in one of a command polling queue (510, 515, 520, 525) and a command interrupt queue (535, 540, 545, 550) responsive to the at least one condition (565) of the storage device (120) and the switching parameter (415).

Statement 50. An embodiment of the inventive concept includes a method according to statement 49, wherein:

receiving (905) an application profile (405, 430, 435) from an application (125, 305, 310, 315) at a storage device (120) includes receiving (905) the application profile (405, 430, 435) from the application (125, 305, 310, 315) at the storage device (120), the application profile (405, 430, 435) including the monitoring parameter (410) and the switching parameter (415), the monitoring parameter (410) drawn from a set including latency, I/O instructions Per Second (IOPS), and a priority, the switching parameter (415) including a threshold (415) for the monitoring parameter (410); and scheduling (930) the I/O command (555) in one of a command polling queue (510, 515, 520, 525) and a command interrupt queue (535, 540, 545, 550) includes:

identifying (1005) a first command queue of the at least one command polling queue (510, 515, 520, 525), the first command queue including a priority;

identifying (1010) a second command queue of the at least one command interrupt queue (535, 540, 545, 550), the second command queue including the priority; and selecting (1015, 1020, 1025) one of the first command queue and the second command queue based on whether the at least one condition (565) of the storage device (120) exceeds the threshold (415) for the monitoring parameter (410).

Statement 51. An embodiment of the inventive concept includes a method according to statement 42, wherein scheduling (930) the I/O command (555) in one of a plurality of command queues (510, 515, 520, 525, 535, 540, 545, 550) includes:

identifying (1005) a first command queue of the plurality of command queues (510, 515, 520, 525, 535, 540, 545, 550), the first command queue including a first priority;

identifying (1010) a second command queue of the plurality of command queues (510, 515, 520, 525, 535, 540, 545, 550), the second command queue including a second priority, the second priority different from the first priority; and selecting (1015, 1020, 1025) one of the first command queue and the second command queue based on whether the at least one condition (565) of the storage device (120) exceeds the threshold (415) for the monitoring parameter (410).

Statement 52. An embodiment of the inventive concept includes a method according to statement 42, further comprising providing (945) feedback (605, 630, 610, 635, 615, 640, 620, 645) to the application (125, 305, 310, 315) regarding the monitoring parameter (410).

Statement 53. An embodiment of the inventive concept includes a method according to statement 52, wherein providing (945) feedback (605, 630, 610, 635, 615, 640, 620, 645) to the application (125, 305, 310, 315) regarding the monitoring parameter (410) includes suggesting (950) to the application (125, 305, 310, 315) a change to at least one of the monitoring parameter (410) and the switching parameter (415) to improve performance.

Statement 54. An embodiment of the inventive concept includes a method according to statement 53, wherein suggesting (950) to the application (125, 305, 310, 315) a change to at least one of the monitoring parameter (410) and the switching parameter (415) to improve performance includes suggesting (950) to the application (125, 305, 310, 315) the change to improve one of an I/O congestion, an I/O issuing model, and an I/O completion model.

Statement 55. An embodiment of the inventive concept includes a method according to statement 52, wherein providing (945) feedback (605, 630, 610, 635, 615, 640, 620, 645) to the application (125, 305, 310, 315) regarding the monitoring parameter (410) includes providing (945) feedback (605, 630, 610, 635, 615, 640, 620, 645) to the application (125, 305, 310, 315) about the one of the plurality of command queues (510, 515, 520, 525, 535, 540, 545, 550).

Statement 56. An embodiment of the inventive concept includes a method according to statement 55, wherein providing (945) feedback (605, 630, 610, 635, 615, 640, 620, 645) to the application (125, 305, 310, 315) about the one of the plurality of command queues (510, 515, 520, 525, 535, 540, 545, 550) includes providing (945) feedback (605, 630, 610, 635, 615, 640, 620, 645) to the application (125, 305, 310, 315) about a minimum latency of the one of the plurality of command queues (510, 515, 520, 525, 535, 540, 545, 550), a maximum latency of the one of the plurality of command queues (510, 515, 520, 525, 535, 540, 545, 550), a minimum I/O instructions Per Second (IOPS) of the one of the plurality of command queues (510, 515, 520, 525, 535, 540, 545, 550), and a maximum TOPS of the one of the plurality of command queues (510, 515, 520, 525, 535, 540, 545, 550).

Statement 57. An embodiment of the inventive concept includes a method according to statement 42, further comprising sending (940) the I/O command (555) to the storage device (120).

Statement 58. An embodiment of the inventive concept includes a method according to statement 57, wherein sending (940) the I/O command (555) to the storage device (120) includes using (935) a scheduling algorithm to select when to remove the I/O command (555) from the one of the plurality of command queues (510, 515, 520, 525, 535, 540, 545, 550) and to send the I/O command (555) to the storage device (120).

Statement 59. An embodiment of the inventive concept includes a method according to statement 58, wherein using (935) a scheduling algorithm includes using (935) a round robin scheduling algorithm to select when to remove the I/O command (555) from the one of the plurality of command queues (510, 515, 520, 525, 535, 540, 545, 550) and to send the I/O command (555) to the storage device (120).

Statement 60. An embodiment of the inventive concept includes a method according to statement 58, wherein using (935) a scheduling algorithm includes using (935) a prioritizing scheduling algorithm to select when the remove the I/O command (555) from the one of the plurality of command queues (510, 515, 520, 525, 535, 540, 545, 550) and to send the I/O command (555) to the storage device (120), where for a command queue of a given priority, the prioritizing scheduling algorithm selects I/O commands (555) from that command queue more frequently than for any command queue of a lower priority than the given priority.

Statement 61. An embodiment of the inventive concept includes a method, comprising:

generating (1105) an application profile (405, 430, 435) for an application (125, 305, 310, 315);

sending (1110) the application profile (405, 430, 435) to a mode configuration module (320);

generating (1120) an input/output (I/O) command (555) for the application (125, 305, 310, 315); and sending (1125) the I/O command (555) to a storage device (120) via an Application Aware Module (325).

Statement 62. An embodiment of the inventive concept includes a method according to statement 61, further comprising receiving (1130) data from the storage device (120).

Statement 63. An embodiment of the inventive concept includes a method according to statement 61, wherein generating (1105) an application profile (405, 430, 435) for an application (125, 305, 310, 315) includes generating (1105) an application profile (405, 430, 435) including a monitoring parameter (410) and a switching parameter (415).

Statement 64. An embodiment of the inventive concept includes a method according to statement 61, wherein generating (1105) an application profile (405, 430, 435) for an application (125, 305, 310, 315) includes generating (1105, 1115) a plurality of application profiles (405, 430, 435) for the application (125, 305, 310, 315).

Statement 65. An embodiment of the inventive concept includes a method according to statement 61, wherein sending (1125) the I/O command (555) to a storage device (120) via an Application Aware Module (325) includes sending (1125) the I/O command (555) and the application profile (405, 430, 435) to the storage device (120) via the Application Aware Module (325).

Statement 66. An embodiment of the inventive concept includes a method according to statement 61, further comprising receiving (1135) feedback (605, 630, 610, 635, 615, 640, 620, 645) from a Dynamic Feedback Module (330).

Statement 67. An embodiment of the inventive concept includes a method according to statement 66, further comprising:

modifying (1140) the application profile (405, 430, 435) based on the feedback (605, 630, 610, 635, 615, 640, 620, 645) to produce a modified application profile (805); and sending (1145) the modified application profile (805) to the Mode Configure Module (320).

Statement 68. An embodiment of the inventive concept includes an article, comprising a tangible storage medium, said tangible storage medium having stored thereon non-transitory instructions that, when executed by a machine (105), result in:

receiving (905) an application profile (405, 430, 435) from an application (125, 305, 310, 315) at a storage device (120), the application profile (405, 430, 435) including a monitoring parameter (410) and a switching parameter (415);

storing (910) the application profile (405, 430, 435) in the storage device (120);

receiving (920) an input/output (I/O) command (555) at the storage device (120), the I/O command (555) including the application profile (405, 430, 435);

determining (925) at least one condition (565) of the storage device (120) around the time the storage device (120) receives the I/O command (555), the at least one condition (565) based on the monitoring parameter (410); and scheduling (930) the I/O command (555) in one of a plurality of command queues (510, 515, 520, 525, 535, 540, 545, 550) responsive to the at least one condition (565) of the storage device (120) and the switching parameter (415).

Statement 69. An embodiment of the inventive concept includes an article according to statement 68, wherein:

receiving (905) an application profile (405, 430, 435) from an application (125, 305, 310, 315) at a storage device (120) includes receiving (905) the application profile (405, 430, 435) from an application (125, 305, 310, 315) at a Solid State Drive (SSD);

storing (910) the application profile (405, 430, 435) in the storage device (120) includes storing (910) the application profile (405, 430, 435) in the SSD;

receiving (920) an I/O command (555) at the storage device (120) includes receiving (920) the I/O command (555) at the SSD; and determining (925) at least one condition (565) of the storage device (120) around the time the storage device (120) receives the I/O command (555) includes determining (925) the at least one condition (565) of the SSD around the time the SSD receives the I/O command (555), the at least one condition (565) based on the monitoring parameter (410).

Statement 70. An embodiment of the inventive concept includes an article according to statement 68, wherein receiving (905) an application profile (405, 430, 435) from an application (125, 305, 310, 315) at a storage device (120) includes receiving (905) the application profile (405, 430, 435) from the application (125, 305, 310, 315) at the storage device (120), the application profile (405, 430, 435) including the monitoring parameter (410) and the switching parameter (415), the monitoring parameter (410) drawn from a set including latency, I/O instructions Per Second (IOPS), and a priority, the switching parameter (415) including a threshold (415) for the monitoring parameter (410).

Statement 71. An embodiment of the inventive concept includes an article according to statement 70, wherein scheduling (930) the I/O command (555) in one of a plurality of command queues (510, 515, 520, 525, 535, 540, 545, 550) includes selecting (1020, 1025) one of the plurality of command queues (510, 515, 520, 525, 535, 540, 545, 550) based on whether the at least one condition (565) of the storage device (120) exceeds the threshold (415) for the monitoring parameter (410).

Statement 72. An embodiment of the inventive concept includes an article according to statement 68, wherein:

receiving (905) an application profile (405, 430, 435) from an application (125, 305, 310, 315) at a storage device (120) includes receiving (905, 915) a plurality of application profiles (405, 430, 435) from the application (125, 305, 310, 315) at the storage device (120); and receiving (920) an I/O command (555) at the storage device (120) includes receiving (920) the I/O command (555) at the storage device (120), the I/O command (555) including one of the plurality of application profiles (405, 430, 435).

Statement 73. An embodiment of the inventive concept includes an article according to statement 68, wherein receiving (920) an I/O command (555) at the storage device (120) includes receiving (920) the I/O command (555) at the storage device (120), the application profile (405, 430, 435) including a priority.

Statement 74. An embodiment of the inventive concept includes an article according to statement 73, wherein scheduling (930) the I/O command (555) in one of a plurality of command queues (510, 515, 520, 525, 535, 540, 545, 550) responsive to the at least one condition (565) of the storage device (120) and the switching parameter (415) includes scheduling (930) the I/O command (555) in one of a plurality of command queues (510, 515, 520, 525, 535, 540, 545, 550) with the priority.

Statement 75. An embodiment of the inventive concept includes an article according to statement 68, wherein scheduling (930) the I/O command (555) in one of a plurality of command queues (510, 515, 520, 525, 535, 540, 545, 550) includes scheduling (930) the I/O command (555) in one of a command polling queue (510, 515, 520, 525) and a command interrupt queue (535, 540, 545, 550) responsive to the at least one condition (565) of the storage device (120) and the switching parameter (415).

Statement 76. An embodiment of the inventive concept includes an article according to statement 75, wherein:

receiving (905) an application profile (405, 430, 435) from an application (125, 305, 310, 315) at a storage device (120) includes receiving (905) the application profile (405, 430, 435) from the application (125, 305, 310, 315) at the storage device (120), the application profile (405, 430, 435) including the monitoring parameter (410) and the switching parameter (415), the monitoring parameter (410) drawn from a set including latency, I/O instructions Per Second (IOPS), and a priority, the switching parameter (415) including a threshold (415) for the monitoring parameter (410); and scheduling (930) the I/O command (555) in one of a command polling queue (510, 515, 520, 525) and a command interrupt queue (535, 540, 545, 550) includes:

identifying (1005) a first command queue of the at least one command polling queue (510, 515, 520, 525), the first command queue including a priority;

identifying (1010) a second command queue of the at least one command interrupt queue (535, 540, 545, 550), the second command queue including the priority; and selecting (1015, 1020, 1025) one of the first command queue and the second command queue based on whether the at least one condition (565) of the storage device (120) exceeds the threshold (415) for the monitoring parameter (410).

Statement 77. An embodiment of the inventive concept includes an article according to statement 68, wherein scheduling (930) the I/O command (555) in one of a plurality of command queues (510, 515, 520, 525, 535, 540, 545, 550) includes:

identifying (1005) a first command queue of the plurality of command queues (510, 515, 520, 525, 535, 540, 545, 550), the first command queue including a first priority;

identifying (1010) a second command queue of the plurality of command queues (510, 515, 520, 525, 535, 540, 545, 550), the second command queue including a second priority, the second priority different from the first priority; and selecting (1015, 1020, 1025) one of the first command queue and the second command queue based on whether the at least one condition (565) of the storage device (120) exceeds the threshold (415) for the monitoring parameter (410).

Statement 78. An embodiment of the inventive concept includes an article according to statement 68, said tangible storage medium having stored thereon further non-transitory instructions that, when executed by the machine (105), result in providing (945) feedback (605, 630, 610, 635, 615, 640, 620, 645) to the application (125, 305, 310, 315) regarding the monitoring parameter (410).

Statement 79. An embodiment of the inventive concept includes an article according to statement 78, wherein providing (945) feedback (605, 630, 610, 635, 615, 640, 620, 645) to the application (125, 305, 310, 315) regarding the monitoring parameter (410) includes suggesting (950) to the application (125, 305, 310, 315) a change to at least one of the monitoring parameter (410) and the switching parameter (415) to improve performance.

Statement 80. An embodiment of the inventive concept includes an article according to statement 79, wherein suggesting (950) to the application (125, 305, 310, 315) a change to at least one of the monitoring parameter (410) and the switching parameter (415) to improve performance includes suggesting (950) to the application (125, 305, 310, 315) the change to improve one of an I/O congestion, an I/O issuing model, and an I/O completion model.

Statement 81. An embodiment of the inventive concept includes an article according to statement 78, wherein providing (945) feedback (605, 630, 610, 635, 615, 640, 620, 645) to the application (125, 305, 310, 315) regarding the monitoring parameter (410) includes providing (945) feedback (605, 630, 610, 635, 615, 640, 620, 645) to the application (125, 305, 310, 315) about the one of the plurality of command queues (510, 515, 520, 525, 535, 540, 545, 550).

Statement 82. An embodiment of the inventive concept includes an article according to statement 81, wherein providing (945) feedback (605, 630, 610, 635, 615, 640, 620, 645) to the application (125, 305, 310, 315) about the one of the plurality of command queues (510, 515, 520, 525, 535, 540, 545, 550) includes providing (945) feedback (605, 630, 610, 635, 615, 640, 620, 645) to the application (125, 305, 310, 315) about a minimum latency of the one of the plurality of command queues (510, 515, 520, 525, 535, 540, 545, 550), a maximum latency of the one of the plurality of command queues (510, 515, 520, 525, 535, 540, 545, 550), a minimum I/O instructions Per Second (IOPS) of the one of the plurality of command queues (510, 515, 520, 525, 535, 540, 545, 550), and a maximum TOPS of the one of the plurality of command queues (510, 515, 520, 525, 535, 540, 545, 550).

Statement 83. An embodiment of the inventive concept includes an article according to statement 68, said tangible storage medium having stored thereon further non-transitory instructions that, when executed by the machine (105), result in sending (940) the I/O command (555) to the storage device (120).

Statement 84. An embodiment of the inventive concept includes an article according to statement 83, wherein sending (940) the I/O command (555) to the storage device (120) includes using (935) a scheduling algorithm to select when to remove the I/O command (555) from the one of the plurality of command queues (510, 515, 520, 525, 535, 540, 545, 550) and to send the I/O command (555) to the storage device (120).

Statement 85. An embodiment of the inventive concept includes an article according to statement 84, wherein using (935) a scheduling algorithm includes using (935) a round robin scheduling algorithm to select when to remove the I/O command (555) from the one of the plurality of command queues (510, 515, 520, 525, 535, 540, 545, 550) and to send the I/O command (555) to the storage device (120).

Statement 86. An embodiment of the inventive concept includes an article according to statement 84, wherein using (935) a scheduling algorithm includes using (935) a prioritizing scheduling algorithm to select when the remove the I/O command (555) from the one of the plurality of command queues (510, 515, 520, 525, 535, 540, 545, 550) and to send the I/O command (555) to the storage device (120), where for a command queue of a given priority, the prioritizing scheduling algorithm selects I/O commands (555) from that command queue more frequently than for any command queue of a lower priority than the given priority.

Statement 87. An embodiment of the inventive concept includes an article, comprising a tangible storage medium, said tangible storage medium having stored thereon non-transitory instructions that, when executed by a machine (105), result in:

generating (1105) an application profile (405, 430, 435) for an application (125, 305, 310, 315);

sending (1110) the application profile (405, 430, 435) to a mode configuration module (320);

generating (1120) an input/output (I/O) command (555) for the application (125, 305, 310, 315); and sending (1125) the I/O command (555) to a storage device (120) via an Application Aware Module (325).

Statement 88. An embodiment of the inventive concept includes an article according to statement 87, said tangible storage medium having stored thereon further non-transitory instructions that, when executed by the machine (105), result in receiving (1130) data from the storage device (120).

Statement 89. An embodiment of the inventive concept includes an article according to statement 87, wherein generating (1105) an application profile (405, 430, 435) for an application (125, 305, 310, 315) includes generating (1105) an application profile (405, 430, 435) including a monitoring parameter (410) and a switching parameter (415).

Statement 90. An embodiment of the inventive concept includes an article according to statement 87, wherein generating (1105) an application profile (405, 430, 435) for an application (125, 305, 310, 315) includes generating (1105, 1115) a plurality of application profiles (405, 430, 435) for the application (125, 305, 310, 315).

Statement 91. An embodiment of the inventive concept includes an article according to statement 87, wherein sending (1125) the I/O command (555) to a storage device (120) via an Application Aware Module (325) includes sending (1125) the I/O command (555) and the application profile (405, 430, 435) to the storage device (120) via the Application Aware Module (325).

Statement 92. An embodiment of the inventive concept includes an article according to statement 87, said tangible storage medium having stored thereon further non-transitory instructions that, when executed by the machine (105), result in receiving (1135) feedback (605, 630, 610, 635, 615, 640, 620, 645) from a Dynamic Feedback Module (330).

Statement 93. An embodiment of the inventive concept includes an article according to statement 92, said tangible storage medium having stored thereon further non-transitory instructions that, when executed by the machine (105), result in:

modifying (1140) the application profile (405, 430, 435) based on the feedback (605, 630, 610, 635, 615, 640, 620, 645) to produce a modified application profile (805); and sending (1145) the modified application profile (805) to the Mode Configure Module (320).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
    a computer;
    a processor;
    a memory;
    a storage device;
    an application stored in the memory, the application capable of being executed by the processor; and
    a device driver, including:
        a Mode Configure Module to receive an application profile, the application profile including a monitoring parameter and a switching parameter; and
        an Application Aware Module to receive an input/output (I/O) command from the application and to assign the I/O command to one of a plurality of command queues based on the switching parameter and a condition of the storage device specified by the monitoring parameter in the application profile,
    wherein the storage device is operative to receive the I/O command from the one of the plurality of command queues,
    wherein the monitoring parameter identifies the condition of the storage device of interest to the application, and
    wherein the switching parameter advises the Application Aware Module as to which of the plurality of command queues to select based on the condition of the storage device.

2. A system according to claim 1, wherein:
    the monitoring parameter is drawn from a set including latency, I/O instructions Per Second (IOPS), and a priority; and
    the switching parameter includes a threshold for the monitoring parameter.

3. A system according to claim 2, wherein the Application Aware Module is operative to assign the I/O command to the one of a plurality of command queues using the application profile based on whether at least one condition of the storage device exceeds the threshold for the monitoring parameter.

4. A system according to claim 1, wherein the plurality of command queues includes at least one command polling queue and at least one command interrupt queue.

5. A system according to claim 4, wherein the Application Aware Module is operative to assign the I/O command to one of a command polling queue and a command interrupt queue of equal priority using the application profile.

6. A system according to claim 1, wherein the device driver further includes a Dynamic Feedback Module to provide feedback to the application regarding the monitoring parameter.

7. A system according to claim 6, wherein the feedback includes a suggestion to the application regarding a change to at least one of the monitoring parameter and the switching parameter to improve performance.

8. A system according to claim 6, wherein the feedback further includes feedback to the application about the one of the plurality of command queues.

9. A system according to claim 1, wherein the device driver includes a scheduler to schedule delivery of the I/O command to the storage device.

10. A method, comprising:
    receiving an application profile from an application at a storage device, the application profile including a monitoring parameter and a switching parameter;
    storing the application profile in the storage device;
    receiving an input/output (I/O) command at the storage device, the I/O command including the application profile;
    determining at least one condition of the storage device around the time the storage device receives the I/O command, the at least one condition based on the monitoring parameter; and
    scheduling the I/O command in one of a plurality of command queues responsive to the at least one condition of the storage device and the switching parameter,
    wherein the monitoring parameter identifies the at least one condition of the storage device of interest to the application, and
    wherein the switching parameter advises an Application Aware Module as to which of the plurality of command queues to select based on the at least one condition of the storage device.

11. A method according to claim 10, wherein scheduling the I/O command in one of a plurality of command queues includes scheduling the I/O command in one of a command polling queue and a command interrupt queue responsive to the at least one condition of the storage device and the switching parameter.

12. A method according to claim 10, further comprising providing feedback to the application regarding the monitoring parameter.

13. A method according to claim 12, wherein providing feedback to the application regarding the monitoring parameter includes suggesting to the application a change to at least one of the monitoring parameter and the switching parameter to improve performance.

14. A method according to claim 12, wherein providing feedback to the application regarding the monitoring parameter includes providing feedback to the application about the one of the plurality of command queues.

15. An article, comprising a tangible storage medium, said tangible storage medium having stored thereon non-transitory instructions that, when executed by a machine, result in:
    receiving an application profile from an application at a storage device, the application profile including a monitoring parameter and a switching parameter;
    storing the application profile in the storage device;
    receiving an input/output (I/O) command at the storage device, the I/O command including the application profile;
    determining at least one condition of the storage device around the time the storage device receives the I/O command based on the monitoring parameter, and scheduling the I/O command in one of a plurality of command queues responsive to the at least one condition of the storage device and the switching parameter, wherein the monitoring parameter identifies the at least one condition of the storage device of interest to the application, and wherein the switching parameter advises an Application Aware Module as to which of the plurality of command queues to select based on the at least one condition of the storage device.

16. An article according to claim 15, wherein scheduling the I/O command in one of a plurality of command queues includes scheduling the I/O command in one of a command polling queue and a command interrupt queue responsive to the at least one condition of the storage device and the switching parameter.

17. An article according to claim 15, said tangible storage medium having stored thereon further non-transitory instructions that, when executed by the machine, result in providing feedback to the application regarding the monitoring parameter.

18. An article according to claim 17, wherein providing feedback to the application regarding the monitoring parameter includes suggesting to the application a change to at least one of the monitoring parameter and the switching parameter to improve performance.

19. An article according to claim 17, wherein providing feedback to the application regarding the monitoring parameter includes providing feedback to the application about the one of the plurality of command queues.

* * * * *